US012567578B2

(12) United States Patent
Kagohashi

(10) Patent No.: US 12,567,578 B2
(45) Date of Patent: Mar. 3, 2026

(54) LEAD-ACID BATTERY

(71) Applicant: GS Yuasa International Ltd., Kyoto (JP)

(72) Inventor: Hiroki Kagohashi, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 1129 days.

(21) Appl. No.: 17/614,889

(22) PCT Filed: May 29, 2020

(86) PCT No.: PCT/JP2020/021476
§ 371 (c)(1),
(2) Date: Nov. 29, 2021

(87) PCT Pub. No.: WO2020/241879
PCT Pub. Date: Dec. 3, 2020

(65) Prior Publication Data
US 2022/0238859 A1     Jul. 28, 2022

(30) Foreign Application Priority Data

May 31, 2019     (JP) ................................ 2019-103310

(51) Int. Cl.
*H01M 4/14*          (2006.01)
*H01M 10/06*        (2006.01)
*H01M 4/02*          (2006.01)

(52) U.S. Cl.
CPC ............. *H01M 4/14* (2013.01); *H01M 10/06* (2013.01); *H01M 2004/021* (2013.01); *H01M 2004/027* (2013.01); *H01M 2004/028* (2013.01)

(58) Field of Classification Search
CPC .. H01M 4/14; H01M 10/06; H01M 2004/021; H01M 2004/027; H01M 2004/028
See application file for complete search history.

(56) References Cited

U.S. PATENT DOCUMENTS

2013/0099749 A1     4/2013   Shibahara et al.
2017/0155171 A1*   6/2017   Kirchev .................. H01M 4/16
(Continued)

FOREIGN PATENT DOCUMENTS

CN          101937996 A       1/2011
CN          104900876 A       9/2015
(Continued)

OTHER PUBLICATIONS

The decision of JPO to grant a Patent for Application JP 2021521910 (Year: 2022).*
(Continued)

*Primary Examiner* — Alexander Usyatinsky
(74) *Attorney, Agent, or Firm* — RANKIN, HILL & CLARK LLP

(57) ABSTRACT
A lead-acid battery includes a positive electrode plate, a negative electrode plate, and an electrolyte solution. The negative electrode plate includes a negative electrode material. The negative electrode material contains a polymer compound, and the polymer compound has a peak in a range of 3.2 ppm or more and 3.8 ppm or less in a chemical shift of $^{1}$H-NMR spectrum. Alternatively, the negative electrode material contains a polymer compound having a repeating structure of oxy $C_{2-4}$ alkylene units. A ratio: $C_n/S_n$ of a content $C_n$ of the polymer compound in the negative electrode material to a specific surface area $S_n$ of the negative electrode material is 25 ppm·m$^{-2}$·g or more.

14 Claims, 4 Drawing Sheets

(56) References Cited

U.S. PATENT DOCUMENTS

| | | | |
|---|---|---|---|
| 2017/0194649 | A1 | 7/2017 | Huusken |
| 2018/0053939 | A1* | 2/2018 | Korzhenko ............ H01M 4/20 |

FOREIGN PATENT DOCUMENTS

| CN | 106099056 | A | | 11/2016 | |
|---|---|---|---|---|---|
| CN | 108630900 | A | | 10/2018 | |
| CN | 108630937 | | * | 10/2018 | |
| CN | 108630937 | A | * | 10/2018 | ............ H01M 4/36 |
| JP | 51-47237 | A2 | | 4/1976 | |
| JP | S51-47237 | | * | 4/1976 | |
| JP | 60-30063 | A2 | | 2/1985 | |
| JP | 60-182662 | A2 | | 9/1985 | |
| JP | 6-60881 | A | | 3/1994 | |
| JP | 9-7600 | A | | 1/1997 | |
| JP | 9-147869 | A | | 6/1997 | |
| JP | 2000-149980 | A | | 5/2000 | |
| JP | 2000-149981 | A | | 5/2000 | |
| JP | 2006-4688 | A | | 1/2006 | |
| JP | 2017-525092 | A | | 8/2017 | |
| JP | 2018-508961 | A | | 3/2018 | |

OTHER PUBLICATIONS

International Search Report (ISR) dated Jul. 28, 2020 filed in PCT/JP2020/021476.

* cited by examiner

LEAD-ACID BATTERY

TECHNICAL FIELD

The present invention relates to a lead-acid battery.

BACKGROUND ART

Lead-acid batteries are in use for various applications, including automotive and industrial applications. The lead-acid batteries include a negative electrode plate, a positive electrode plate, a separator (or mat), an electrolyte solution, and the like. An additive may be added to constituent members of the lead-acid battery from the viewpoint of imparting various functions.

Patent Document 1 proposes a lead-acid battery in which a copolymer of propylene oxide and ethylene oxide was added to a negative electrode plate active material in combination with lignin sulfonate.

Patent Document 2 proposes a lead-acid battery in which an activator containing an organic polymer is enclosed in a small sealed case having a cleavage mechanism into a container, and the small sealed case is attached to the container or a lid part.

Patent Document 3 proposes a fiber-attached mat containing a plurality of fibers coated with a size composition, a binder composition, and one or more additives, in which the additives include one or more of rubber additives, rubber derivatives, aldehydes, metal salts, ethylene-propylene oxide block copolymers, sulfuric acid esters, sulfonic acid esters, phosphoric acid esters, polyacrylic acid, polyvinyl alcohol, lignin, phenol formaldehyde resins, cellulose, wood flour, and the like, and the additives can function to reduce moisture loss in a lead-acid battery.

Patent Document 4 proposes use, in the preparation of a lead battery electrode formulation, of a liquid composition, stable over time, comprising from 0.2% by weight to 10% by weight of carbon-based nanofillers, at least one water-soluble polymer and from 0.01% by weight to 50% by weight of at least one cationic component chosen from alkali metal or alkaline earth metal cations and ammonium ions dispersed in an aqueous medium, the carbon-based nanofillers being carbon nanotubes, graphene or a mixture of carbon nanotubes and graphene in all proportions, and the water-soluble polymer being chosen from polysaccharides; modified polysaccharides, such as modified celluloses; polyethers, such as polyalkylene oxides or polyalkylene glycols; lignosulphonates; polyacrylates; products based on polycarboxylic acids, in particular polyether polycarboxylates or their copolymers; naphthalenesulphonates and their derivatives; and their corresponding aqueous solutions.

PRIOR ART DOCUMENTS

Patent Documents

Patent Document 1: JP-A-60-182662
Patent Document 2: JP-A-2000-149980
Patent Document 3: JP-W-2017-525092
Patent Document 4: JP-W-2018-508961

SUMMARY OF THE INVENTION

Problems to be Solved by the Invention

When a lead surface is covered with an organic additive, a reductive reaction of hydrogen ions hardly occurs, and therefore, an amount of overcharge tends to decrease. On the other hand, when the lead surface is covered with the organic additive, lead sulfate generated during discharge is hardly eluted during charge, so that charge acceptability is deteriorated. Thus, it is difficult to achieve both suppression of deterioration of the charge acceptability and reduction in the amount of overcharge.

Means for Solving the Problems

One aspect of the present invention relates to a lead-acid battery including a positive electrode plate, a negative electrode plate, and an electrolyte solution, in which the negative electrode plate includes a negative electrode material, the negative electrode material contains a polymer compound, the polymer compound has a peak in a range of 3.2 ppm or more and 3.8 ppm or less in a chemical shift of $^1$H-NMR spectrum, and a ratio: $C_n/S_n$ of a content $C_n$ of the polymer compound in the negative electrode material to a specific surface area $S_n$ of the negative electrode material is 25 ppm·m$^{-2}$·g or more.

Another aspect of the present invention relates to a lead-acid battery including a positive electrode plate, a negative electrode plate, and an electrolyte solution, in which the negative electrode plate includes a negative electrode material, the negative electrode material contains a polymer compound having a repeating structure of oxy $C_{2-4}$ alkylene units, and a ratio: $C_n/S_n$ of a content $C_n$ of the polymer compound in the negative electrode material to a specific surface area $S_n$ of the negative electrode material is 25 ppm·m$^{-2}$·g or more.

Advantages of the Invention

In the lead-acid battery, it is possible to suppress the deterioration of the charge acceptability while reducing the amount of overcharge.

MODE FOR CARRYING OUT THE INVENTION

Figure 1:
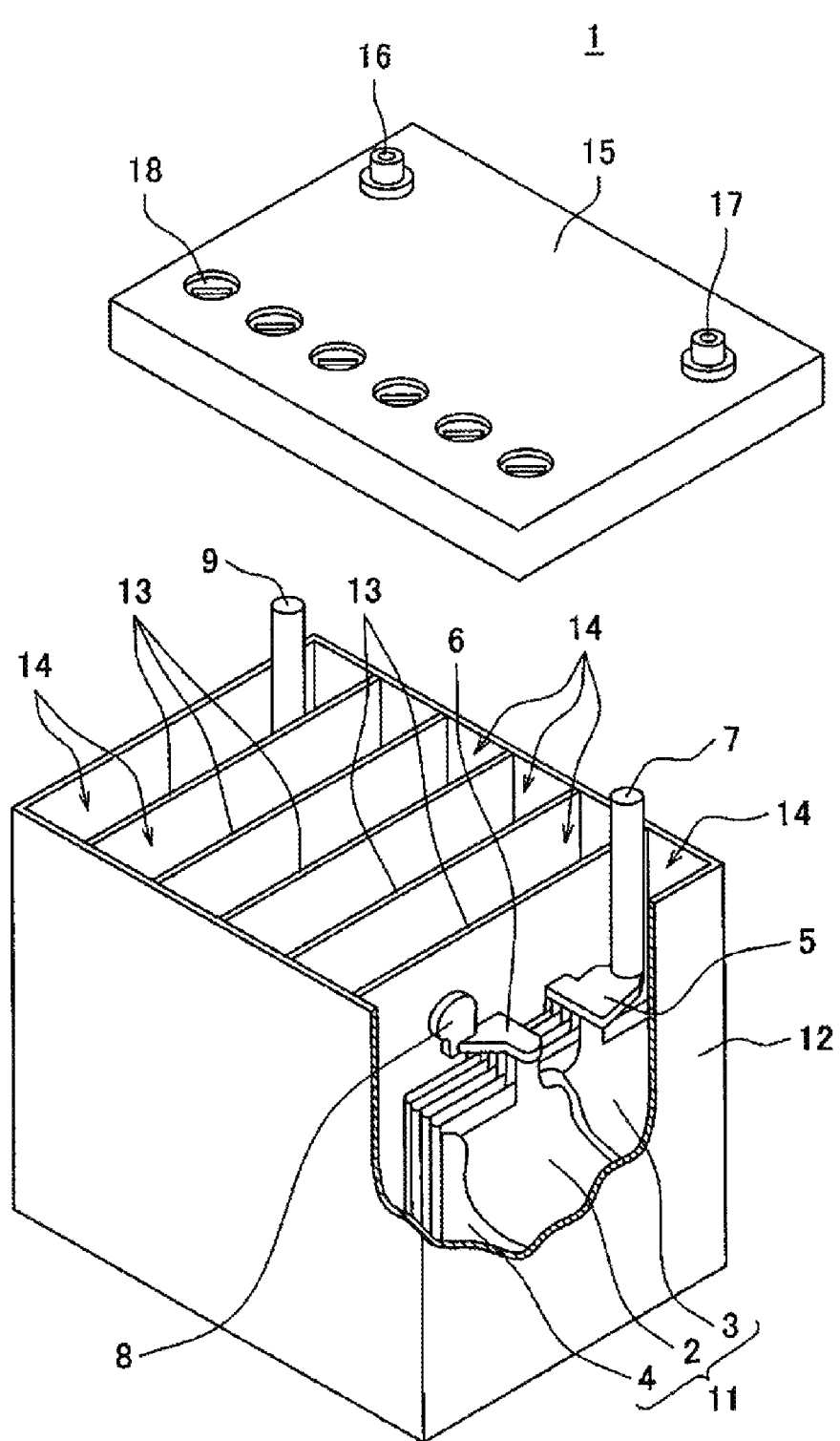
FIG. 1 is a partially cutaway exploded perspective view showing an appearance and an internal structure of a lead-acid battery according to one aspect of the present invention.

In general, when an organic additive is contained in a negative electrode material of a lead-acid battery, the organic additive adheres to a surface of lead as an active material. When the lead surface is covered with the organic additive, lead sulfate generated during discharge is hardly eluted during charge, so that charge acceptability is deteriorated.

In general, in the lead-acid battery, the reaction during overcharge is greatly affected by a reductive reaction of hydrogen ions at an interface between lead and an electrolyte solution. When a lead surface is covered with an organic additive, a reductive reaction of hydrogen ions hardly occurs, and therefore, an amount of overcharge tends to decrease. Thus, suppression of deterioration of the charge acceptability and reduction in the amount of overcharge are in a trade-off relationship, and it has been conventionally difficult to achieve both simultaneously. In addition, when the organic additive is unevenly distributed in lead pores, it is necessary to increase a content of the organic additive in the negative electrode material in order to secure a sufficient effect of reducing the amount of overcharge. However, in general, when the content of the organic additive is increased, the charge acceptability is greatly deteriorated.

In the lead-acid battery, in general, since a sulfuric acid aqueous solution is used as an electrolyte solution, when an organic additive (oil, polymer, organic expander, or the like) is contained in a negative electrode material, it becomes difficult to balance elution into the electrolyte solution and adsorption to lead. For example, when an organic additive having low adsorptivity to lead is used, elution into the electrolyte solution becomes easy, so that the amount of overcharge is hardly reduced. On the other hand, when an organic additive having high adsorptivity to lead is used, it is difficult to thinly adhere the organic additive to the lead surface, and the organic additive tends to be unevenly distributed in the lead pores.

When the organic additive is unevenly distributed in the lead pores, movement of ions (such as lead ions and sulfate ions) is inhibited by steric hindrance of the unevenly distributed organic additive. Thus, a charge-discharge reaction is likely to be inhibited, and low temperature high rate (HR) discharge performance is also deteriorated. When the content of the organic additive is increased in order to secure a sufficient effect of reducing the amount of overcharge, movement of ions in the pores is further inhibited, so that the charge-discharge reaction is further inhibited, and the low temperature HR discharge performance is also deteriorated.

On the other hand, a lead-acid battery according to one aspect of the present invention includes a positive electrode plate, a negative electrode plate, and an electrolyte solution. The negative electrode plate includes a negative electrode material, and the negative electrode material contains a polymer compound. The polymer compound has a peak in a range of 3.2 ppm or more and 3.8 ppm or less in a chemical shift of $^1$H-NMR spectrum. A ratio: $C_n/S_n$ of a content $C_n$ of the polymer compound in the negative electrode material to a specific surface area $S_n$ of the negative electrode material is 25 ppm·m$^{-2}$·g or more.

Note that the peak appearing in the range of 3.2 ppm or more and 3.8 ppm or less in the $^1$H-NMR spectrum is derived from an oxy C$_{2-4}$ alkylene unit. Here, the $^1$H-NMR spectrum is measured using deuterated chloroform as a solvent.

A lead-acid battery according to another aspect of the present invention includes a positive electrode plate, a negative electrode plate, and an electrolyte solution, and the negative electrode plate includes a negative electrode material. The negative electrode material contains a polymer compound having a repeating structure of oxy C$_{2-4}$ alkylene units. The ratio: ratio $C_n/S_n$ of the content $C_n$ of the polymer compound in the negative electrode material to the specific surface area $S_n$ of the negative electrode material is 25 ppm·m$^{-2}$·g or more.

In general, when the specific surface area of the negative electrode material increases, a side reaction during overcharge is likely to occur, and the amount of overcharge is likely to increase. On the other hand, in the lead-acid battery according to one aspect and another aspect of the present invention, the polymer compound as described above is contained in the negative electrode material at the ratio $C_n/S_n$ of 25 ppm·m$^{-2}$·g or more. Thus, it is possible to suppress the deterioration of the charge acceptability while reducing the amount of overcharge.

The reason why the amount of overcharge is reduced is considered to be that the surface of lead in the negative electrode material is covered with the polymer compound, so that a hydrogen overvoltage increases, and a side reaction in which hydrogen is generated from protons during overcharge is inhibited. When a carbonaceous material is contained in the negative electrode material, a surface of the carbonaceous material is also covered with the polymer compound, and it is considered that generation of hydrogen on the surface of the carbonaceous material is also inhibited.

The polymer compound easily takes a linear structure by having oxy C$_{2-4}$ alkylene units, and thus it is considered that the polymer compound hardly remains in the negative electrode material and easily diffuses into the electrolyte solution. Thus, it is expected that the effect of reducing the amount of overcharge is hardly obtained even when the polymer compound is used. However, contrary to such expectation, the present inventors have actually found that even when a very small amount of a polymer compound is contained in the negative electrode material, the effect of reducing the amount of overcharge can be obtained. Since even a very small amount of the polymer compound can provide the effect of reducing the amount of overcharge, it is considered that when the polymer compound is contained in the negative electrode material, the polymer compound can be present near lead, whereby a high adsorption action of the oxy C$_{2-4}$ alkylene unit on lead is exerted. It is further considered that the polymer compound spreads thinly on the lead surface and the reductive reaction of hydrogen ions in a wide region of the surface of the negative electrode material is suppressed. This does not contradict that the polymer compound easily takes a linear structure. According to one aspect and another aspect of the present invention, when such a polymer compound is contained in the negative electrode material in a ratio according to the specific surface area of the negative electrode material, the side reaction during overcharge is inhibited, and the amount of overcharge can be effectively reduced. Since suppression of hydrogen generation during overcharge can reduce the liquid decrease, it is advantageous for prolonging the life of the lead-acid battery. When the carbonaceous material is contained in the negative electrode material, it is considered that the polymer compound spreads thinly also on the surface of the carbonaceous material. Thus, it is considered that the reductive reaction of hydrogen ions on the surface of the carbonaceous material is also suppressed.

Since the polymer compound thinly covers the lead surface, elution of lead sulfate, generated during discharge, during charge is less likely to be inhibited. Since the uneven distribution of the polymer compound in the lead pores is suppressed, ions easily move. From these points, the deterioration of the charge acceptability can be suppressed.

Since ions easily move in the lead pores, it is also possible to suppress deterioration of the low temperature HR discharge performance. In addition, since the amount of overcharge can be reduced, a structural change of the negative active material due to collision of the hydrogen gas with the negative active material can also be suppressed. Thus, even after the high temperature light load test in which the structural change of the negative active material is likely to occur, the effect of suppressing the deterioration of the low temperature HR discharge performance can be enhanced.

According to one aspect and another aspect of the present invention, by controlling the ratio $C_n/S_n$, it is easy to balance the effect of reducing the amount of overcharge and the effect of suppressing the deterioration of the charge acceptability while securing an excellent effect of reducing the amount of overcharge.

In order to obtain the effect of the polymer compound as described above, the polymer compound needs to be present near lead or lead sulfate. Thus, it is important that the negative electrode material contains the polymer compound regardless of whether or not a component of the lead-acid battery other than the negative electrode material contains the polymer compound. By controlling the ratio $C_n/S_n$, the hydrogen overvoltage in the negative electrode plate can be increased, whereby the amount of overcharge can be reduced, and the deterioration of the charge acceptability can be suppressed. The deterioration of the low temperature HR discharge performance after the high temperature light load test can be suppressed.

It is sufficient that the polymer compound can be contained in the negative electrode material, and the source of the polymer compound contained in the negative electrode material is not particularly limited. The polymer compound may be contained in any of the components (for example, a negative electrode plate, a positive electrode plate, an electrolyte solution, and/or a separator, and the like) of the lead-acid battery when preparing the lead-acid battery. The polymer compound may be contained in one constituent element, or may be contained in two or more constituent elements (for example, a negative electrode plate, an electrolyte solution, and the like).

The specific surface area $S_n$ of the negative electrode material is a BET specific surface area ($m^2 \cdot g^{-1}$) determined by a gas adsorption method using nitrogen gas. The ratio $C_n/S_n$ is determined by dividing the content $C_n$ (ppm) of the polymer compound contained in the negative electrode material by a BET specific surface area $S_n$ ($m^2 \cdot g^{-1}$) of the negative electrode material. The content $C_n$ of the polymer compound is determined by the procedure described later.

The specific surface area $S_n$ of the negative electrode material and the content $C_n$ of the polymer compound in the negative electrode material are each determined for the negative electrode plate of the lead-acid battery in a fully charged state.

The lead-acid battery may be either a valve regulated (sealed) lead-acid battery or a flooded-type (vented type) lead-acid battery.

In the present specification, the fully charged state of the flooded-type lead-acid battery is defined by the definition of JIS D 5301: 2006. More specifically, the following state is defined as a fully charged state: the lead-acid battery is charged at a current (A) 0.2 times as large as a numerical value described as a rated capacity (Ah) until a terminal voltage during charge measured every 15 minutes or an electrolyte solution density subjected to temperature correction to 20° C. exhibits a constant value at three significant digits continuously three times. In the case of a valve regulated lead-acid battery, the fully charged state is a state where the lead-acid battery is subjected to constant current constant voltage charge of 2.23 V/cell at a current (A) 0.2 times as large as the numerical value described as the rated capacity (Ah) in an air tank of 25° C.±2° C., and the charge is completed when the charge current (A) during constant voltage charge becomes 0.005 times as large as the numerical value described in the rated capacity (Ah). Note that the numerical value described as the rated capacity is a numerical value in which the unit is Ah. The unit of the current set based on the numerical value indicated as the rated capacity is A.

The lead-acid battery in the fully charged state refers to a battery obtained by fully charging a formed lead-acid battery. The full charge of the lead-acid battery may be performed immediately after formation so long as being performed after formation or may be performed after the lapse of time from formation (e.g., a lead-acid battery in use (preferably at the initial stage of use) after formation may be fully charged). The battery at the initial stage of use refers to a battery that has not been used for a long time and has hardly deteriorated.

In the lead-acid battery according to one aspect of the present invention, the polymer compound may contain an oxygen atom bonded to a terminal group and a —$CH_2$— group and/or a —CH< group bonded to the oxygen atom. In the $^1$H-NMR spectrum, a ratio of an integrated value of the peak of 3.2 ppm to 3.8 ppm to the sum of the integrated value of this peak, an integrated value of a peak of hydrogen atoms of the —$CH_2$— group bonded to the oxygen atom, and an integrated value of a peak of a hydrogen atom of the —CH< group bonded to the oxygen atom is preferably 85% or more. Such polymer compounds contain many oxy $C_{2-4}$ alkylene units in the molecule. Therefore, it is considered that it becomes easy to adsorb to lead, and it becomes easy to thinly cover the lead surface by easily taking a linear structure. Thus, the amount of overcharge can be more effectively reduced. The effect of suppressing the deterioration of the charge acceptability can be further enhanced. It is also possible to secure an excellent effect of suppressing the deterioration of the low temperature HR discharge performance.

In the $^1$H-NMR spectrum, the polymer compound having a peak in the chemical shift range of 3.2 ppm to 3.8 ppm preferably contains a repeating structure of oxy $C_{2-4}$ alkylene units. When a polymer compound containing a repeating structure of oxy $C_{2-4}$ alkylene units is used, it is considered it becomes easier to adsorb to lead, and it becomes easy to thinly cover the lead surface by easily taking a linear structure. Thus, the effect of suppressing the deterioration of the charge acceptability can be further enhanced, and the amount of overcharge can be more effectively reduced. Even after the high temperature light load test, the effect of suppressing the deterioration of the low temperature HR discharge performance can be further enhanced.

In the present specification, the polymer compound refers to a compound having a repeating unit of oxy $C_{2-4}$ alkylene units and/or having a number average molecular weight (Mn) of 500 or more.

In the present specification, the number average molecular weight Mn is determined by gel permeation chromatography (GPC). A standard substance used for determining Mn is polyethylene glycol.

Note that the oxy $C_{2-4}$ alkylene unit is a unit represented by —O—$R^1$— ($R^1$ represents a $C_{2-4}$ alkylene group.).

The polymer compound may contain at least one selected from the group consisting of etherified products of a hydroxy compound having a repeating structure of oxy $C_{2-4}$ alkylene units and esterified products of a hydroxy compound having a repeating structure of oxy $C_{2-4}$ alkylene units. Here, the hydroxy compound is at least one selected from the group consisting of poly $C_{2-4}$ alkylene glycols, copolymers containing a repeating structure of oxy $C_{2-4}$ alkylene, and $C_{2-4}$ alkylene oxide adducts of a polyol. When such a polymer compound is used, the deterioration of the charge acceptability can be further suppressed. Since the effect of reducing the amount of overcharge is high, generation of hydrogen gas can be more effectively suppressed, and a high liquid decrease suppressing effect can be obtained.

The repeating structure of oxy $C_{2-4}$ alkylene units may contain at least a repeating structure of oxypropylene units ($-O-CH(CH_3)-CH_2-$). Such a polymer compound easily spreads thinly on a lead surface while having high adsorptivity to lead, and is considered to have an excellent balance therebetween. Thus, the amount of overcharge can be more effectively reduced, and higher charge acceptability can be easily secured. In addition, the effect of suppressing the deterioration of the low temperature HR discharge performance can be further enhanced.

As described above, since the polymer compound can thinly cover the lead surface while having high adsorptivity to lead, even if the content of the polymer compound in the negative electrode material is relatively small, the amount of overcharge can be reduced. Since a sufficient effect of reducing the amount of overcharge can be secured even if the content is small, it is also possible to suppress the deterioration of charge acceptability. In addition, by controlling the ratio $C_n/S_n$, it is easy to balance the effect of reducing the amount of overcharge and the effect of suppressing the deterioration of the charge acceptability. Steric hindrance of the polymer compound in the lead pores can be reduced, and the structural change of the negative active material due to collision of the hydrogen gas can also be suppressed, so that the deterioration of the low temperature HR discharge performance can be suppressed even after the high temperature light load test.

From the viewpoint of securing higher charge acceptability, the ratio $C_n/S_n$ is preferably 800 ppm·m$^{-2}$·g or less.

The ratio $C_n/S_n$ is preferably 450 ppm·m$^{-2}$·g or less from the viewpoint of suppressing the lead surface from being excessively covered with the polymer compound and easily securing high low temperature HR discharge performance.

The negative electrode material can contain a carbonaceous material. A content $C_c$ of the carbonaceous material in the negative electrode material is preferably 0.45% by mass or more. In this case, the effect of suppressing the amount of overcharge is further enhanced, and a higher effect of suppressing the deterioration of the charge acceptability can be obtained.

The polymer compound preferably contains at least a compound having Mn of 1,000 or more. In this case, the polymer compound tends to remain in the negative electrode material, and in addition, the adsorbability to lead is enhanced; therefore, the effect of reducing the amount of overcharge is further enhanced. By reducing the amount of overcharge, the structural change of the negative active material due to collision of the hydrogen gas with the negative electrode material can also be suppressed. Thus, even after the high temperature light load test in which the structural change of the negative active material is likely to occur, the effect of suppressing the deterioration of the low temperature HR discharge performance can be enhanced.

The negative electrode material may further contain an organic expander (first organic expander) having a sulfur element content of 2,000 μmol/g or more. When such an organic expander and the polymer compound are used in combination, the deterioration of the charge acceptability can be further suppressed. The charge acceptability is governed by a dissolution rate of lead sulfate during charge in the negative electrode plate. In a case where an amount of discharge is the same, when the first organic expander is used, a particle size of lead sulfate generated during discharge is smaller than that when the organic expander (second organic expander) having a small sulfur element content (for example, less than 2,000 μmol/g, preferably 1,000 μmol/g or less) is used, and a specific surface area of lead sulfate increases. Thus, in the case of using the first organic expander, a ratio of a surface of lead sulfate covered with the polymer compound is smaller than that in the case of using the second organic expander. Thus, it is considered that dissolution of lead sulfate is hardly inhibited, and the deterioration of the charge acceptability is suppressed.

The negative electrode material may contain the second organic expander. When the second organic expander and the polymer compound are used in combination, a particle size of a colloid can be reduced, so that the effect of suppressing the deterioration of the low temperature HR discharge performance can be further enhanced.

The negative electrode material may contain the second organic expander in addition to the first organic expander. When the first organic expander and the second organic expander are used in combination with the polymer compound, the effect of suppressing the deterioration of the charge acceptability can be synergistically enhanced, and the first organic expander and the second organic expander form different kinds of colloids in the negative electrode material. At a boundary where different types of colloids are in contact with each other, adhesion between the colloids is lower than that at a boundary where the same type of colloids are in contact with each other. Thus, lead ions easily pass through the boundary where different types of colloids are in contact with each other. Thus, the dissolution of lead sulfate easily proceeds. As a result, it is considered that a synergistic effect in suppressing the deterioration of the charge acceptability is obtained.

The first organic expander may contain a condensate containing a unit of an aromatic compound having a sulfur-containing group, and the condensate may contain, as the unit of the aromatic compound, at least one selected from the group consisting of a unit of a bisarene compound and a unit of a monocyclic aromatic compound. The condensate may contain the unit of the bisarene compound and the unit of the monocyclic aromatic compound The unit of the monocyclic aromatic compound may include a unit of a hydroxyarene compound. Such a condensate is more advantageous in suppressing the deterioration of the low temperature HR discharge performance after the high temperature light load test because the low temperature HR discharge performance is not impaired even when the condensate experiences an environment higher than normal temperature.

The sulfur element content in the organic expander being X μmol/g means that the content of the sulfur element contained per 1 g of the organic expander is X μmol.

Hereinafter, the lead-acid battery according to an embodiment of the present invention will be described for each of the main constituent elements, but the present invention is not limited to the following embodiment.

[Lead-Acid Battery]

(Negative Electrode Plate)

The negative electrode plate usually includes a negative current collector in addition to a negative electrode material. The negative electrode material is obtained by removing the negative current collector from the negative electrode plate. Note that a member such as a mat or a pasting paper may be stuck to the negative electrode plate. Such a member (sticking member) is used integrally with the negative electrode plate and is thus assumed to be included in the negative electrode plate. Also, when the negative electrode plate includes such a member, the negative electrode material excludes the negative current collector and the sticking member. However, when the sticking member such as a mat is attached to a separator, a thickness of the sticking member is included in a thickness of the separator.

The negative current collector may be formed by casting lead (Pb) or a lead alloy, or may be formed by processing a lead sheet or a lead alloy sheet. Examples of the processing method include expanding processing and punching processing. It is preferable to use a negative electrode grid as the negative current collector because the negative electrode material is easily supported.

The lead alloy used for the negative current collector may be any of a Pb—Sb-based alloy, a Pb—Ca-based alloy, and a Pb—Ca—Sn-based alloy. The lead or lead alloys may further contain, as an additive element, at least one selected from the group consisting of Ba, Ag, Al, Bi, As, Se, Cu, and the like. The negative current collector may include a surface layer. The surface layer and the inner layer of the negative current collector may have different compositions. The surface layer may be formed in a part of the negative current collector. The surface layer may be formed in the lug of the negative current collector. The surface layer of the lug may contain Sn or an Sn alloy.

The negative electrode material contains the above polymer compound. The negative electrode material further contains a negative active material (lead or lead sulfate) that exhibits a capacity through a redox reaction. The negative electrode material may contain an expander, a carbonaceous material, and/or other additives. Examples of the additive include barium sulfate, fibers (resin fibers and the like), and the like, but are not limited thereto. Note that the negative active material in the charged state is spongy lead, but the non-formed negative electrode plate is usually prepared using lead powder.

The specific surface area $S_n$ of the negative electrode material is, for example, 0.3 $m^2 \cdot g^{-1}$ or more. From the viewpoint of easily securing higher low temperature HR discharge performance, the specific surface area $S_n$ is preferably 0.5 $m^2 \cdot g^{-1}$ or more, and more preferably 0.7 $m^2 \cdot g^{-1}$ or more. The specific surface area $S_n$ is, for example, 4 $m^2 \cdot g^{-1}$ or less. From the viewpoint of further enhancing the effect of suppressing the amount of overcharge, the specific surface area $S_n$ is preferably 3.5 $m^2 \cdot g^{-1}$ or less, and more preferably 2.5 $m^2 \cdot g^{-1}$ or less. From the viewpoint of easily securing higher low temperature HR discharge performance, the specific surface area $S_n$ is more preferably 2 $m^2 \cdot g^{-1}$ or less or 1.5 $m^2 \cdot g^{-1}$ or less.

The specific surface area $S_n$ of the negative electrode material may be 0.3 $m^2 \cdot g^{-1}$ or more and 4 $m^2 \cdot g^{-1}$ or less (or 3.5 $m^2 \cdot g^{-1}$ or less), 0.3 $m^2 \cdot g^{-1}$ or more and 2.5 $m^2 \cdot g^{-1}$ or less (or 2 $m^2 \cdot g^{-1}$ or less), 0.3 $m^2 \cdot g^{-1}$ or more and 1.5 $m^2 \cdot g^{-1}$ or less, 0.5 $m^2 \cdot g^{-1}$ or more and 4 $m^2 \cdot g^{-1}$ or less (or 3.5 $m^2 \cdot g^{-1}$ or less), 0.5 $m^2 \cdot g^{-1}$ or more and 2.5 $m^2 \cdot g^{-1}$ or less (or 2 $m^2 \cdot g^{-1}$ or less), 0.5 $m^2 \cdot g^{-1}$ or more and 1.5 $m^2 \cdot g^{-1}$ or less, 0.7 $m^2 \cdot g^{-1}$ or more and 4 $m^2 \cdot g^{-1}$ or less (or 3.5 $m^2 \cdot g^{-1}$ or less), 0.7 $m^2 \cdot g^{-1}$ or more and 2.5 $m^2 \cdot g^{-1}$ (or 2 $m^2 \cdot g^{-1}$ or less), or 0.7 $m^2 \cdot g^{-1}$ or more and 1.5 $m^2 \cdot g^{-1}$ or less.

The specific surface area $S_n$ of the negative electrode material can be adjusted, for example, by adjusting the specific surface area and/or the content of the constituent components (in particular, carbonaceous material) of the negative electrode material.

(Polymer Compound)

The polymer compound has a peak in a range of 3.2 ppm or more and 3.8 ppm or less in a chemical shift of $^1$H-NMR spectrum. Such polymer compounds have oxy $C_{2-4}$ alkylene units. Examples of the oxy $C_{2-4}$ alkylene unit include an oxyethylene unit, an oxypropylene unit, an oxytrimethylene unit, an oxy 2-methyl-1,3-propylene unit, an oxy 1,4-butylene unit, an oxy 1,3-butylene unit, and the like. The polymer compound may have one kind or two or more kinds of such oxy $C_{2-4}$ alkylene units.

The polymer compound preferably contains a repeating structure of oxy $C_{2-4}$ alkylene units. The repeating structure may contain one kind of oxy $C_{2-4}$ alkylene unit, or may contain two or more kinds of oxy $C_{2-4}$ alkylene units. The polymer compound may contain one kind of the repeating structure or two or more kinds of repeating structures.

Examples of the polymer compound include hydroxy compounds having a repeating structure of oxy $C_{2-4}$ alkylene units (poly $C_{2-4}$ alkylene glycols, copolymers containing a repeating structure of oxy $C_{2-4}$ alkylene, $C_{2-4}$ alkylene oxide adducts of a polyol, and the like), etherified or esterified products of these hydroxy compounds, and the like.

Examples of the copolymer include copolymers containing different oxy $C_{2-4}$ alkylene units, poly $C_{2-4}$ alkylene glycol alkyl ethers, poly $C_{2-4}$ alkylene glycol esters of carboxylic acids, and the like. The copolymer may be a block copolymer.

The polyol may be any of an aliphatic polyol, an alicyclic polyol, an aromatic polyol, a heterocyclic polyol, and the like. From the viewpoint that the polymer compound easily spreads thinly on the lead surface, aliphatic polyols, alicyclic polyols (for example, polyhydroxycyclohexane, polyhydroxynorbornane, and the like), and the like are preferable, and among them, aliphatic polyols are preferable. Examples of the aliphatic polyol include aliphatic diols and polyols of triol or higher (for example, glycerin, trimethylolpropane, pentaerythritol, sugar alcohol, and the like), and the like. Examples of the aliphatic diol include an alkylene glycol having 5 or more carbon atoms. The alkylene glycol may be, for example, a $C_{5-14}$ alkylene glycol or a $C_{5-10}$ alkylene glycol. Examples of the sugar alcohol include erythritol, xylitol, mannitol, sorbitol, and the like. In the alkylene oxide adduct of the polyol, the alkylene oxide corresponds to an oxy $C_{2-4}$ alkylene unit of the polymer compound and contains at least $C_{2-4}$ alkylene oxide. From the viewpoint that the polymer compound easily take a linear structure, the polyol is preferably a diol.

The etherified product has an —$OR^2$ group obtained by etherifying —OH groups (—OH groups composed of a hydrogen atom of a terminal group and an oxygen atom bonded to the hydrogen atom) at at least a part of terminals of the hydroxy compound having the repeating structure of oxy $C_{2-4}$ alkylene units (wherein $R^2$ is an organic group). Among terminals of the polymer compound, some terminals may be etherified, or all terminals may be etherified. For example, one terminal of a main chain of the linear polymer compound may be an —OH group, and the other terminal may be an —$OR^2$ group.

The esterified product has an —O—C(=O)—$R^3$ group obtained by esterifying —OH groups (—OH groups composed of a hydrogen atom of a terminal group and an oxygen atom bonded to the hydrogen atom) at at least a part of terminals of the hydroxy compound having the repeating structure of oxy $C_{2-4}$ alkylene units (wherein $R^3$ is an organic group). Among terminals of the polymer compound, some terminals may be esterified, or all terminals may be esterified. For example, one terminal of a main chain of the linear polymer compound may be an —OH group, and the other terminal may be an —O—C(=O)—R$^3$ group.

Examples of each of the organic groups R$^2$ and R$^3$ include a hydrocarbon group. The hydrocarbon group may have a substituent (for example, a hydroxy group, an alkoxy group, and/or a carboxy group, and the like). The hydrocarbon group may be any of aliphatic, alicyclic, and aromatic. The aromatic hydrocarbon group and the alicyclic hydrocarbon group may have an aliphatic hydrocarbon group (for example, an alkyl group, an alkenyl group, an alkynyl group, or the like) as a substituent. The number of carbon atoms of the aliphatic hydrocarbon group as a substituent may be, for example, 1 to 20, 1 to 10, 1 to 6, or 1 to 4.

Examples of the aromatic hydrocarbon group include aromatic hydrocarbon groups having 24 or less carbon atoms (for example, 6 to 24). The number of carbon atoms of the aromatic hydrocarbon group may be 20 or less (for example, 6 to 20), 14 or less (for example, 6 to 14), or 12 or less (for example, 6 to 12). Examples of the aromatic hydrocarbon group include an aryl group, a bisaryl group, and the like. Examples of the aryl group include a phenyl group, a naphthyl group, and the like. Examples of the bisaryl group include monovalent groups corresponding to bisarene. Examples of the bisarene include biphenyl and bisarylalkanes (for example, bis C$_{6-10}$ aryl C$_{1-4}$ alkanes (such as 2,2-bisphenylpropane), and the like).

Examples of the alicyclic hydrocarbon group include alicyclic hydrocarbon groups having 16 or less carbon atoms. The alicyclic hydrocarbon group may be a bridged cyclic hydrocarbon group. The number of carbon atoms of the alicyclic hydrocarbon group may be 10 or less or 8 or less. The number of carbon atoms of the alicyclic hydrocarbon group is, for example, 5 or more, and may be 6 or more.

The number of carbon atoms of the alicyclic hydrocarbon group may be 5 (or 6) or more and 16 or less, 5 (or 6) or more and 10 or less, or 5 (or 6) or more and 8 or less.

Examples of the alicyclic hydrocarbon group include cycloalkyl groups (cyclopentyl group, cyclohexyl group, cyclooctyl group, and the like), cycloalkenyl groups (cyclohexenyl group, cyclooctenyl group, and the like), and the like. The alicyclic hydrocarbon group also includes hydrogenated products of the aromatic hydrocarbon groups.

Among the hydrocarbon groups, an aliphatic hydrocarbon group is preferable from the viewpoint that the polymer compound easily adheres thinly to the lead surface. Examples of the aliphatic hydrocarbon group include alkyl groups, alkenyl groups, alkynyl groups, dienyl groups, and the like. The aliphatic hydrocarbon group may be either linear or branched.

The number of carbon atoms of the aliphatic hydrocarbon group is, for example, 30 or less, and may be 26 or less or 22 or less, 20 or less or 16 or less, 14 or less or 10 or less, or 8 or less or 6 or less. The lower limit of the number of carbon atoms is 1 or more for an alkyl group, 2 or more for an alkenyl group and an alkynyl group, and 3 or more for a dienyl group, depending on the type of the aliphatic hydrocarbon group. Among them, an alkyl group and an alkenyl group are preferable from the viewpoint that the polymer compound easily adheres thinly to the lead surface.

Specific examples of the alkyl group include methyl, ethyl, n-propyl, i-propyl, n-butyl, i-butyl, s-butyl, t-butyl, n-pentyl, neopentyl, i-pentyl, s-pentyl, 3-pentyl, t-pentyl, n-hexyl, 2-ethylhexyl, n-octyl, n-decyl, i-decyl, lauryl, myristyl, cetyl, stearyl, behenyl, and the like.

Specific examples of the alkenyl group include vinyl, 1-propenyl, allyl, palmitoleyl, oleyl, and the like. An alkenyl group may be, for example, a C$_{2-30}$ alkenyl group or a C$_{2-26}$ alkenyl group, a C$_{2-22}$ alkenyl group or a C$_{2-20}$ alkenyl group, or a C$_{10-20}$ alkenyl group.

When an etherified product of a hydroxy compound having a repeating structure of oxy C$_{2-4}$ alkylene units and/or an esterified product of a hydroxy compound having a repeating structure of oxy C$_{2-4}$ alkylene units are used among the polymer compounds, it is preferable because the effect of suppressing the deterioration of the charge acceptability can be further enhanced. Even when these polymer compounds are used, a high liquid decrease suppressing effect can be secured.

The negative electrode material may contain one kind or two or more kinds of polymer compounds.

From the viewpoint of further enhancing the effect of reducing the amount of overcharge and enhancing the effect of suppressing the deterioration of the charge acceptability and/or the low temperature HR discharge performance, it is preferable that the repeating structure of oxy C$_{2-4}$ alkylene includes at least a repeating structure of oxypropylene units. The polymer compound containing the oxypropylene unit has peaks derived from —CH< and —CH$_2$— of the oxypropylene unit in a range of 3.2 ppm to 3.8 ppm in a chemical shift of $^1$H-NMR spectrum. Since electron densities around a nucleus of a hydrogen atom in these groups are different, the peak is split. Such a polymer compound has peaks, for example, in a range of 3.2 ppm or more and 3.42 ppm or less and a range of more than 3.42 ppm and 3.8 ppm or less in a chemical shift of $^1$H-NMR spectrum. The peak in the range of 3.2 ppm or more and 3.42 ppm or less is derived from —CH$_2$—, and the peak in the range of more than 3.42 ppm and 3.8 ppm or less is derived from —CH< and —CH$_2$—.

Examples of such a polymer compound include polypropylene glycol, a copolymer containing a repeating structure of oxypropylene, a propylene oxide adduct of the polyol, etherified or esterified products thereof, and the like. Examples of the copolymer include oxypropylene-oxyalkylene copolymers (provided that the oxyalkylene is a C$_{2-4}$ alkylene other than oxypropylene), polypropylene glycol alkyl ethers, a polypropylene glycol ester of a carboxylic acid, and the like. Examples of the oxypropylene-oxyalkylene copolymer include an oxypropylene-oxyethylene copolymer, an oxypropylene-oxytrimethylene copolymer, and the like. The oxypropylene-oxyalkylene copolymer may be a block copolymer.

In the polymer compound containing a repeating structure of oxypropylene, the proportion of the oxypropylene unit is, for example, 5 mol % or more, and may be 10 mol % or more or 20 mol % or more.

It is preferable that the polymer compound contains a large amount of oxy C$_{2-4}$ alkylene units from the viewpoint of enhancing adsorptivity to lead and easily taking a linear structure. Such a polymer compound includes, for example, an oxygen atom bonded to a terminal group and a —CH$_2$— group and/or a —CH< group bonded to the oxygen atom. In the $^1$H-NMR spectrum of the polymer compound, the ratio of the integrated value of the peak of 3.2 ppm to 3.8 ppm to the sum of the integrated value of this peak, the integrated value of the peak of the hydrogen atoms of the —CH$_2$— group, and the integrated value of the peak of the hydrogen atom of the —CH< group increases. This ratio is, for example, 50% or more, and may be 80% or more. From the viewpoint of further enhancing the effect of reducing the amount of overcharge and further enhancing the effect of suppressing the deterioration of the charge acceptability and/or the low temperature HR discharge performance, the above ratio is preferably 85% or more, and more preferably 90% or more. For example, when the polymer compound has an —OH group at a terminal and also has a —$CH_2$— group or a —CH< group bonded to an oxygen atom of the —OH group, in the $^1$H-NMR spectrum, the peaks of the hydrogen atoms of the —$CH_2$— group and the —CH< group have a chemical shift in a range of more than 3.8 ppm and 4.0 ppm or less.

The polymer compound may contain a compound having Mn of 500 or more, a compound having Mn of 600 or more, or a compound having Mn of 1,000 or more. Mn of such a compound is, for example, 20,000 or less, and may be 15,000 or less or 10,000 or less. The Mn of the compound is preferably 5,000 or less and may be 4,000 or less or 3,000 or less, from the viewpoint of easily retaining the compound in the negative electrode material and easily spreading the compound thinner on the lead surface.

The Mn of the compound may be 500 or more (or 600 or more) and 20,000 or less, 500 or more (or 600 or more) and 15,000 or less, 500 or more (or 600 or more) and 10,000 or less, 500 or more (or 600 or more) and 5,000 or less, 500 or more (or 600 or more) and 4,000 or less, 500 or more (or 600 or more) and 3,000 or less, 1,000 or more and 20,000 or less (or 15,000 or less), 1,000 or more and 10,000 or less (or 5,000 or less), or 1,000 or more and 4,000 or less (or 3,000 or less).

The polymer compound preferably contains at least a compound having Mn of 1,000 or more. Mn of such a compound may be 1,000 or more and 20,000 or less, 1,000 or more and 15,000 or less, or 1,000 or more and 10,000 or less. The Mn of the compound is preferably 1,000 or more and 5,000 or less, and may be 1,000 or more and 4,000 or less, or 1,000 or more and 3,000 or less, from the viewpoint of easily retaining the compound in the negative electrode material and easily spreading more thinly to the lead surface. When a compound having such Mn is used, the amount of overcharge can be reduced more easily. By reducing the amount of overcharge, the structural change of the negative active material due to collision of the hydrogen gas with the negative active material can also be suppressed. Thus, the effect of suppressing the deterioration of the low temperature HR discharge performance after the high temperature light load test can be enhanced. Since the compound having Mn as described above easily moves into the negative electrode material even when the compound is contained in the electrolyte solution, the compound can be replenished into the negative electrode material, and from such a viewpoint, the compound is easily retained in the negative electrode material. As the polymer compound, two or more compounds having different Mn may be used. That is, the polymer compound may have a plurality of peaks of Mn in the distribution of the molecular weight.

The ratio $C_n/S_n$ is 25 ppm·m$^{-2}$·g or more, preferably 26 ppm·m$^{-2}$·g or more, and may be 50 ppm·m$^{-2}$·g or more or 90 ppm·m$^{-2}$·g or more. When the ratio $C_n/S_n$ is in such a range, it is possible to suppress the deterioration of the charge acceptability while reducing the amount of overcharge. It is easy to ensure high low temperature HR discharge performance (in particular, low temperature HR discharge performance after high temperature light load test). The ratio $C_n/S_n$ is preferably 800 ppm·m$^{-2}$·g or less, and more preferably 730 ppm·m$^{-2}$·g or less or 600 ppm·m$^{-2}$·g or less. When the ratio $C_n/S_n$ is in such a range, it is easy to secure higher charge acceptability. The ratio $C_n/S_n$ is preferably 450 ppm·m$^{-2}$·g or less, and more preferably 410 ppm·m$^{-2}$·g or less from the viewpoint of enhancing the effect of suppressing the deterioration of the low temperature HR discharge performance after the high temperature light load test.

The ratio $C_n/S_n$ may be 25 ppm·m$^{-2}$·g or more (or 26 ppm·m$^{-2}$·g or more) and 800 ppm·m$^{-2}$·g or less, 25 ppm·m$^{-2}$·g or more (or 26 ppm·m$^{-2}$·g or more) and 730 ppm·m$^{-2}$·g or less, 25 ppm·m$^{-2}$·g or more (or 26 ppm·m$^{-2}$·g or more) and 600 ppm·m$^{-2}$·g or less, 25 ppm·m$^{-2}$·g or more (or 26 ppm·m$^{-2}$·g or more) and 450 ppm·m$^{-2}$·g or less, 25 ppm·m$^{-2}$·g or more (or 26 ppm·m$^{-2}$·g or more) and 410 ppm·m$^{-2}$·g or less, 50 ppm·m$^{-2}$·g or more (or 90 ppm·m$^{-2}$·g or more) and 800 ppm·m$^{-2}$·g or less, 50 ppm·m$^{-2}$·g or more (or 90 ppm·m$^{-2}$·g or more) and 730 ppm·m$^{-2}$·g or less, 50 ppm·m$^{-2}$·g or more (or 90 ppm·m$^{-2}$·g or more) and 600 ppm·m$^{-2}$·g or less, 50 ppm·m$^{-2}$·g or more (or 90 ppm·m$^{-2}$·g or more) and 450 ppm·m$^{-2}$·g or less, or 50 ppm·m$^{-2}$·g or more (or 90 ppm·m$^{-2}$·g or more) and 410 ppm·m$^{-2}$·g or less.

The content $C_n$ of the polymer compound in the negative electrode material is, for example, more than 8 ppm, preferably 10 ppm or more or 13 ppm or more, more preferably 15 ppm or more, and may be 30 ppm or more or 40 ppm or more on a mass basis. When the content $C_n$ of the polymer compound is in such a range, hydrogen generation voltage can be more easily increased, and the effect of reducing the amount of overcharge can be further enhanced. From the viewpoint of easily securing higher low temperature HR discharge performance, the content $C_n$ (mass basis) of the polymer compound in the negative electrode material may be 50 ppm or more or 80 ppm or more, and may be 100 ppm or more. The content $C_n$ (mass basis) of the polymer compound in the negative electrode material is, for example, 3,000 ppm or less, and may be 2,500 ppm or less or 2,000 ppm or less. From the viewpoint of suppressing the lead surface from being excessively covered with the polymer compound and thus effectively and easily suppressing the deterioration of the low temperature HR discharge performance, the content $C_n$ (on a mass basis) of the polymer compound is preferably 1,000 ppm or less, more preferably 600 ppm or less or 500 ppm or less, and may be 300 ppm or less or 200 ppm or less. These lower limit values and upper limit values can be combined arbitrarily.

The content $C_n$ (mass basis) of the polymer compound in the negative electrode material may be more than 8 ppm (or 10 ppm or more) and 3,000 ppm or less, more than 8 ppm (or 10 ppm or more) and 2,500 ppm or less, more than 8 ppm (or 10 ppm or more) and 2,000 ppm or less, more than 8 ppm (or 10 ppm or more) and 1,000 ppm or less, more than 8 ppm (or 10 ppm or more) and 600 ppm or less, more than 8 ppm (or 10 ppm or more) and 500 ppm or less, more than 8 ppm (or 10 ppm more) and 200 ppm or less, 13 ppm or more (or 15 ppm more) and 3,000 ppm or less, 13 ppm or more (or 15 ppm more) and 2,500 ppm or less, 13 ppm or more (or 15 ppm more) and 2,000 ppm or less, 13 ppm or more (or 15 ppm more) and 1,000 ppm or less, 13 ppm or more (or 15 ppm or more) and 600 ppm or less, 13 ppm or more (or 15 ppm or more) and 500 ppm or less, 13 ppm or more (or 15 ppm or more) and 300 ppm or less, 13 ppm or more (or 15 ppm or more) and 200 ppm or less, 30 ppm or more (or 40 ppm or more) and 3,000 ppm or less, 30 ppm or more (or 40 ppm or more) and 2,500 ppm or less, 30 ppm or more (or 40 ppm or more) and 2,000 ppm or less, 30 ppm or more (or 40 ppm or more) and 1,000 ppm or less, 30 ppm or more (or 40 ppm or more) and 600 ppm or less, 30 ppm or more (or 40 ppm or more) and 500 ppm or less, 30 ppm or more (or 40 ppm or more) and 300 ppm or less, 30 ppm or more (or 40 ppm or more) and 200 ppm or less, 50 ppm or more (or 80 ppm or more) and 3,000 ppm or less, 50 ppm or more (or 80 ppm or more) and 2,500 ppm or less, 50 ppm or more (or 80 ppm or more) and 2,000 ppm or less, 50 ppm or more (or 80 ppm or more) and 1,000 ppm or less, 50 ppm or more (or 80 ppm or more) and 600 ppm or less, 50 ppm or more (or 80 ppm or more) and 500 ppm or less, 50 ppm or more (or 80 ppm or more) and 300 ppm or less, 50 ppm or more (or 80 ppm or more) and 200 ppm or less, 100 ppm or more and 3,000 ppm or less (or 2,500 ppm or less), 100 ppm or more and 2,000 ppm or less (or 1,000 ppm or less), 100 ppm or more and 600 ppm or less (or 500 ppm or less), or 100 ppm or more and 300 ppm or less (or 200 ppm or less).

(Carbonaceous Material)

Examples of the carbonaceous material include carbon black, graphite, hard carbon, soft carbon, and the like. Examples of the carbon black include acetylene black, Ketjen black, furnace black, lamp black, and the like. The graphite may be a carbonaceous material including a graphite-type crystal structure and may be either artificial graphite or natural graphite. One kind of carbonaceous material may be used alone, or two or more kinds thereof may be used in combination.

Among the carbonaceous materials, the carbonaceous material in which an intensity ratio $I_D/I_G$ of a peak (D band) appearing in a range of 1,300 cm$^{-1}$ or more and 1,350 cm$^{-1}$ or less in a Raman spectrum to a peak (G band) appearing in a range of 1,550 cm$^{-1}$ or more and 1,600 cm$^{-1}$ or less is 0 or more and 0.9 or less is referred to as graphite. The graphite may be either artificial graphite or natural graphite.

Since the polymer compound also covers the surface of the carbonaceous material, a coating amount with respect to lead or lead sulfate is also affected by the specific surface area and amount of the carbonaceous material.

A specific surface area $S_c$ of the carbonaceous material is, for example, 0.5 (m$^2$·g$^{-1}$) or more, and may be, for example, 0.8 (m$^2$·g$^{-1}$) or more, 1 (m$^2$·g$^{-1}$) or more, 2 (m$^2$·g$^{-1}$) or more, 20 (m$^2$·g$^{-1}$) or more, 25 (m$^2$·g$^{-1}$) or more, 50 (m$^2$·g$^{-1}$) or more, 70 (m$^2$·g$^{-1}$) or more, 100 (m$^2$·g$^{-1}$) or more, or 130 (m$^2$·g$^{-1}$) or more. When the specific surface area $S_c$ is in such a range, it is easy to suppress an excessive increase in the content of the polymer compound and to secure high charge acceptability. The specific surface area Sc may be, for example, 1,500 (m$^2$·g$^{-1}$) or less, 1,000 (m$^2$·g$^{-1}$) or less, 700 (m$^2$·g$^{-1}$) or less, or 650 (m$^2$·g$^1$) or less, and may be 200 (m$^2$·g$^{-1}$) or less, 150 (m$^2$·g$^{-1}$) or less, or 130 (m$^2$·g$^{-1}$) or less. When the specific surface area $S_c$ is in such a range, gas generation on the surface of the carbonaceous material tends to be remarkable; however, even in such a case, gas generation can be suppressed by combining with the polymer compound.

The specific surface area $S_c$ of the carbonaceous material may be 0.5 (or 0.8) (m$^2$·g$^{-1}$) or more and 1,500 (m$^2$·g$^{-1}$) or less, 0.5 (or 0.8) (m$^2$·g$^{-1}$) or more and 1,000 (m$^2$·g$^{-1}$) or less, 0.5 (or 0.8) (m$^2$·g$^{-1}$) or more and 700 (m$^2$·g$^{-1}$) or less, 0.5 (or 0.8) (m$^2$·g$^{-1}$) or more and 650 (m$^2$·g$^{-1}$) or less, 0.5 (or 0.8) (m$^2$·g$^{-1}$) or more and 200 (m$^2$·g$^{-1}$) or less, 0.5 (or 0.8) (m$^2$·g$^{-1}$) or more and 150 (m$^2$·g$^{-1}$) or less, 0.5 (or 0.8) (m$^2$·g$^{-1}$) or more and 130 (m$^2$·g$^{-1}$) or less, 1 (or 2) (m$^2$·g$^{-1}$) or more and 1,500 (m$^2$·g$^{-1}$) or less, 1 (or 2) (m$^2$·g$^{-1}$) or more and 1,000 (m$^2$·g$^{-1}$) or less, 1 (or 2) (m$^2$·g$^{-1}$) or more and 700 (m$^2$·g$^{-1}$) or less, 1 (or 2) (m$^2$·g$^{-1}$) or more and 650 (m$^2$·g$^{-1}$) or less, 1 (or 2) (m$^2$·g$^{-1}$) or more and 200 (m$^2$·g$^{-1}$) or less, 1 (or 2) (m$^2$·g$^{-1}$) or more and 150 (m$^2$·g$^{-1}$) or less, 1 (or 2) (m$^2$·g$^{-1}$) or more and 130 (m$^2$·g$^{-1}$) or less, 20 (or 25) (m$^2$·g$^{-1}$) or more and 1,500 (m$^2$·g$^{-1}$) or less, 20 (or 25) (m$^2$·g$^{-1}$) or more and 1,000 (m$^2$·g$^{-1}$) or less, 20 (or 25) (m$^2$·g$^{-1}$) or more and 700 (m$^2$·g$^{-1}$) or less, 20 (or 25)

(m$^2$·g$^{-1}$) or more and 650 (m$^2$·g$^{-1}$) or less, 20 (or 25) (m$^2$·g$^{-1}$) or more and 200 (m$^2$·g$^{-1}$) or less, 20 (or 25) (m$^2$·g$^{-1}$) or more and 150 (m$^2$·g$^{-1}$) or less, 20 (or 25) (m$^2$·g$^{-1}$) or more and 130 (m$^2$·g$^{-1}$) or less, 50 (or 70) (m$^2$·g$^{-1}$) or more and 1,500 (m$^2$·g$^{-1}$) or less, 50 (or 70) (m$^2$·g$^{-1}$) or more and 1,000 (m$^2$·g$^{-1}$) or less, 50 (or 70) (m$^2$·g$^{-1}$) or more and 700 (m$^2$·g$^{-1}$) or less, 50 (or 70) (m$^2$·g$^{-1}$) or more and 650 (m$^2$·g$^{-1}$) or less, 50 (or 70) (m$^2$·g$^{-1}$) or more and 200 (m$^2$·g$^{-1}$) or less, 50 (or 70) (m$^2$·g$^{-1}$) or more and 150 (m$^2$·g$^{-1}$) or less, 50 (or 70) (m$^2$·g$^{-1}$) or more and 130 (m$^2$·g$^{-1}$) or less, 100 (or 130) (m$^2$·g$^{-1}$) or more and 1,500 (m$^2$·g$^{-1}$) or less, 100 (or 130) (m$^2$·g$^{-1}$) or more and 1,000 (m$^2$·g$^{-1}$) or less, 100 (or 130) (m$^2$·g$^{-1}$) or more and 700 (m$^2$·g$^{-1}$) or less, 100 (or 130) (m$^2$·g$^{-1}$) or more and 650 (m$^2$·g$^{-1}$) or less, or 100 (or 130) (m$^2$·g$^{-1}$) or more and 200 (m$^2$·g$^{-1}$) or less.

The specific surface area $S_c$ of the carbonaceous material is the BET specific surface area determined by the gas adsorption method using nitrogen gas.

The carbonaceous material may include a first carbonaceous material having a particle size of 32 μm or more, and may include a second carbonaceous material having a particle size of less than 32 μm. The carbonaceous material may include both the first carbonaceous material and the second carbonaceous material. The first carbonaceous material and the second carbonaceous material are separated and distinguished by a procedure described later.

Examples of the first carbonaceous material include at least one selected from the group consisting of graphite, hard carbon, and soft carbon. Among them, the first carbonaceous material preferably contains at least graphite. By using graphite, higher PSOC life performance can be secured. The second carbonaceous material preferably contains at least carbon black.

When the carbonaceous material contains the second carbonaceous material, a ratio of the second carbonaceous material in the whole carbonaceous material is, for example, 10% by mass or more, may be 40% by mass or more, and may be 50% by mass or more or 60% by mass or more. When the ratio of the second carbonaceous material is within such a range, it is advantageous in securing higher charge acceptability. The ratio of the second carbonaceous material in the whole carbonaceous material is, for example, 100% by mass or less. From the viewpoint of easily securing higher low temperature HR discharge performance, the ratio of the second carbonaceous material may be 90% by mass or less.

The ratio of the second carbonaceous material in the whole carbonaceous material may be 10% by mass or more (or 40% by mass or more) and 100% by mass or less, 10% by mass or more (or 40% by mass or more) and 90% by mass or less, 50% by mass or more (or 60% by mass or more) and 100% by mass or less, or 50% by mass or more (or 60% by mass or more) and 90% by mass or less.

The content $C_c$ of the carbonaceous material in the negative electrode material is, for example, 0.01% by mass or more and may be 0.1% by mass or more. The content $C_c$ is preferably 0.2% by mass or more or 0.3% by mass or more from the viewpoint of easily securing higher charge acceptability. The content $C_c$ is preferably 0.45% by mass or more from the viewpoint of further enhancing the effect of suppressing the amount of overcharge and obtaining a higher effect of suppressing the deterioration of the charge acceptability. The content $C_c$ is, for example, 5% by mass or less and may be 3.5% by mass or less. From the viewpoint of easily securing a larger amount of overcharge, the content $C_c$ is preferably 3% by mass or less.

The content $C_c$ of the carbonaceous material may be 0.01% by mass or more (or 0.1% by mass or more) and 5% by mass or less, 0.01% by mass or more (or 0.1% by mass or more) and 3.5% by mass or less, 0.01% by mass or more (or 0.1% by mass or more) and 3% by mass or less, 0.2% by mass or more (or 0.3% by mass or more) and 5% by mass or less, 0.2% by mass or more (or 0.3% by mass or more) and 3.5% by mass or less, 0.2% by mass or more (or 0.3% by mass or more) and 3% by mass or less, 0.45% by mass or more and 5% by mass or less (or 3.5% by mass or less), or 0.45% by mass or more and 3% by mass or less.

(Expander)

The negative electrode material can contain an expander. As the expander, an organic expander is preferable. As the organic expander, lignins and/or a synthetic organic expander may be used. Examples of the lignins include lignin, lignin derivatives, and the like. Examples of the lignin derivative include lignin sulfonic acid or salts thereof (such as alkali metal salts (sodium salts and the like)), and the like. The organic expanders are generally roughly classified into lignins and synthetic organic expanders. It can also be said that the synthetic organic expander is an organic expander other than lignins. The synthetic organic expander is an organic polymer containing sulfur element, and generally contains a plurality of aromatic rings in the molecule and sulfur element as a sulfur-containing group. Among the sulfur-containing groups, a sulfonic acid group or a sulfonyl group which is in a stable form is preferable. The sulfonic acid group may exist in an acid form, or may exist in a salt form like a Na salt. The negative electrode material may contain one kind or two or more kinds of expanders.

As the organic expander, it is preferable to use a condensate containing at least a unit of an aromatic compound. Examples of such a condensate include a condensate of an aromatic compound with an aldehyde compound (aldehydes (for example, formaldehyde) and/or condensates thereof, and the like). The organic expander may contain a unit of one kind of an aromatic compound or a unit of two or more kinds of aromatic compounds.

Note that the unit of an aromatic compound refers to a unit derived from an aromatic compound incorporated in a condensate.

Examples of the aromatic ring of the aromatic compound include a benzene ring, a naphthalene ring, and the like. When the aromatic compound has a plurality of aromatic rings, the plurality of aromatic rings may be linked by a direct bond, a linking group (for example, an alkylene group (including an alkylidene group), a sulfone group, and the like), or the like. Examples of such a structure include bisarene structures (biphenyl, bisphenylalkane, bisphenylsulfone, and the like). Examples of the aromatic compound include compounds having the aromatic ring and a hydroxy group and/or an amino group. The hydroxy group or the amino group may be directly bonded to the aromatic ring, or may be bonded as an alkyl chain having a hydroxy group or an amino group. Note that the hydroxy group also includes salts of hydroxy group (—OMe). The amino group also includes salts of amino group (salts with anion). Examples of Me include alkali metals (Li, K, Na, and the like), Group 2 metals of the periodic table (Ca, Mg, and the like), and the like.

As the aromatic compound, bisarene compounds [bisphenol compounds, hydroxybiphenyl compounds, bisarene compounds having an amino group (bisarylalkane compounds having an amino group, bisarylsulfone compounds having an amino group, biphenyl compounds having an amino group, and the like), hydroxyarene compounds (hydroxynaphthalene compounds, phenol compounds, and the like), aminoarene compounds (aminonaphthalene compounds, aniline compounds (aminobenzenesulfonic acid, alkylaminobenzenesulfonic acid, and the like), and the like), and the like] are preferable. The aromatic compound may further have a substituent. The organic expander may contain one or more or a plurality of residues of these compounds. As the bisphenol compound, bisphenol A, bisphenol S, bisphenol F, and the like are preferable.

The condensate preferably contains a unit of an aromatic compound having at least a sulfur-containing group. In particular, when a condensate containing at least a unit of a bisphenol compound having a sulfur-containing group is used, an effect of suppressing deterioration of low temperature HR discharge performance after high temperature light load test can be enhanced. From the viewpoint of enhancing the effect of suppressing liquid decrease, it is preferable to use a condensate of a naphthalene compound having a sulfur-containing group and having a hydroxy group and/or an amino group with an aldehyde compound.

The sulfur-containing group may be directly bonded to the aromatic ring contained in the compound, and for example, may be bonded to the aromatic ring as an alkyl chain having a sulfur-containing group. The sulfur-containing group is not particularly limited, and examples thereof include a sulfonyl group, a sulfonic acid group or a salt thereof, and the like.

In addition, as the organic expander, for example, at least a condensate containing at least one selected from the group consisting of units of the bisarene compound and units of a monocyclic aromatic compound (hydroxyarene compound and/or aminoarene compound, or the like) may be used. The organic expander may contain at least a condensate containing a unit of a bisarene compound and a unit of a monocyclic aromatic compound (among them, hydroxyarene compound). Examples of such a condensate include a condensate of a bisarene compound and a monocyclic aromatic compound with an aldehyde compound. As the hydroxyarene compound, a phenol sulfonic acid compound (phenol sulfonic acid, a substituted product thereof, or the like) is preferable. As the aminoarene compound, aminobenzenesulfonic acid, alkylaminobenzenesulfonic acid, and the like are preferable. As the monocyclic aromatic compound, a hydroxyarene compound is preferable.

The negative electrode material may contain, for example, the first organic expander having a sulfur element content of 2,000 μmol/g or more among the organic expanders. Examples of the first organic expander include the synthetic organic expander describe above (such as the condensate).

The sulfur element content of the first organic expander may be 2,000 μmol/g or more, and is preferably 3,000 μmol/g or more. The upper limit of the sulfur element content of the organic expander is not particularly limited, and is preferably 9,000 μmol/g or less, and more preferably 8,000 μmol/g or less or 7,000 μmol/g or less from the viewpoint of further enhancing an effect of suppressing the liquid decrease. These lower limit values and upper limit values can be combined arbitrarily. By combining such an organic expander and the polymer compound, the dissolution of lead sulfate during charge is less likely to be inhibited, so that the deterioration of the charge acceptability can be further suppressed.

The sulfur element content of the first organic expander may be, for example, 2,000 μmol/g or more (or 3,000 μmol/g or more) and 9,000 μmol/g or less, 2,000 μmol/g or more (or 3,000 μmol/g or more) and 8,000 μmol/g or less, or 2,000 μmol/g or more (or 3,000 μmol/g or more) and 7,000 μmol/g or less.

A weight average molecular weight (Mw) of the first organic expander is preferably, for example, 7,000 or more. The Mw of the first organic expander is, for example, 100,000 or less, and may be 20,000 or less.

In the present specification, the Mw of the organic expander is determined by GPC. A standard substance used for determining the Mw is sodium polystyrene sulfonate.

The Mw is measured under the following conditions using the following apparatus.

GPC apparatus: Build-up GPC system SD-8022/DP-8020/AS-8020/CO-8020/UV-8020 (manufactured by Tosoh Corporation)

Column: TSKgel G4000SWXL, G2000SWXL (7.8 mm I.D.×30 cm) (manufactured by Tosoh Corporation)

Detector: UV detector, $\lambda$=210 nm

Eluent: Mixed solution of NaCl aqueous solution having a concentration of 1 mol/L: acetonitrile (volume ratio=7:3)

Flow rate: 1 mL/min.

Concentration: 10 mg/mL

Injection amount: 10 μL

Standard substance: Na polystyrene sulfonate (Mw=275, 000, 35,000, 12,500, 7,500, 5,200, 1,680)

The negative electrode material can contain, for example, the second organic expander having a sulfur element content of less than 2,000 μmol/g. Examples of the second organic expander include lignins and synthetic organic expanders (in particular, lignins) among the organic expanders described above. The sulfur element content of the second organic expander is preferably 1,000 μmol/g or less, and may be 800 μmol/g or less. The lower limit of the sulfur element content in the second organic expander is not particularly limited, and is, for example, 400 μmol/g or more. When the second organic expander and the polymer compound are used in combination, the particle size of the colloid can be reduced, so that the effect of suppressing the deterioration of the low temperature HR discharge performance can be further enhanced.

The Mw of the second organic expander is, for example, less than 7,000. The Mw of the second organic expander is, for example, 3,000 or more.

When the first organic expander and the second organic expander are used in combination, the mass ratio thereof can be arbitrarily selected. From the viewpoint of easily securing the synergistic effect in suppressing the deterioration of the charge acceptability, a ratio of the first organic expander to a total amount of the first organic expander and the second organic expander is preferably 20% by mass or more, and may be 25% by mass or more. From the same viewpoint, the ratio of the first organic expander to the total amount of the first organic expander and the second organic expander is preferably 80% by mass or less, and may be 75% by mass or less.

The ratio of the first organic expander to the total amount of the first organic expander and the second organic expander may be 20% by mass or more and 80% by mass or less (or 75% by mass or less), or 25% by mass or more and 80% by mass or less (or 75% by mass or less).

The content of the organic expander contained in the negative electrode material is, for example, 0.01% by mass or more and may be 0.05% by mass or more. The content of the organic expander is, for example, 1.0% by mass or less and may be 0.5% by mass or less. These lower limit values and upper limit values can be combined arbitrarily.

The content of the organic expander contained in the negative electrode material may be 0.01% by mass or more and 1.0% by mass or less, 0.05% by mass or more and 1.0% by mass or less, 0.01% by mass or more and 0.5% by mass or less, or 0.05% by mass or more and 0.5% by mass or less.

(Barium Sulfate)

The content of barium sulfate in the negative electrode material is, for example, 0.05% by mass or more and may be 0.10% by mass or more. The content of barium sulfate in the negative electrode material is 3% by mass or less and may be 2% by mass or less. These lower limit values and upper limit values can be combined arbitrarily.

The content of barium sulfate in the negative electrode material may be 0.05% by mass or more and 3% by mass or less, 0.05% by mass or more and 2% by mass or less, 0.10% by mass or more and 3% by mass or less, or 0.10% by mass or more and 2% by mass or less.

(Analysis of Constituent Components of Negative Electrode Material)

Hereinafter, a method of analyzing the negative electrode material or constituent components thereof will be described. Prior to analysis, a lead-acid battery after formation is fully charged and then disassembled to obtain a negative electrode plate to be analyzed. The obtained negative electrode plate is washed with water to remove sulfuric acid from the negative electrode plate. The washing with water is performed until it is confirmed that color of a pH test paper does not change by pressing the pH test paper against the surface of the negative electrode plate washed with water. However, the washing with water is performed within two hours. The negative electrode plate washed with water is dried at 60±5° C. in a reduced pressure environment for about six hours. When an attached member is included after drying, the attached member is removed from the negative electrode plate by peeling. Next, the negative electrode material is separated from the negative electrode plate to obtain a sample (hereinafter also referred to as sample A.). The sample A is ground as necessary and subjected to analysis.

(1) Analysis of Polymer Compound (1-1) Qualitative Analysis of Polymer Compound 150.0±0.1 mL of chloroform is added to 100.0±0.1 g of the pulverized sample A, and the mixture is stirred at 20±5° C. for 16 hours to extract a polymer compound. Thereafter, the solid content is removed by filtration. For a chloroform solution in which the polymer compound obtained by the extraction is dissolved or a polymer compound obtained by drying the chloroform solution, information is obtained from an infrared spectroscopic spectrum, an ultraviolet-visible absorption spectrum, an NMR spectrum, LC-MS and/or pyrolysis GC-MS, and the like to specify the polymer compound.

Chloroform is distilled off under reduced pressure from the chloroform solution in which the polymer compound obtained by the extraction is dissolved to recover a chloroform soluble component. The chloroform soluble component is dissolved in deuterated chloroform, and a $^1$H-NMR spectrum is measured under the following conditions. From this $^1$H-NMR spectrum, a peak with a chemical shift in the range of 3.2 ppm or more and 3.8 ppm or less is confirmed. Also, from the peak in this range, the type of the oxy $C_{2-4}$ alkylene unit is specified.

Apparatus: type AL400 nuclear magnetic resonance spectrometer, manufactured by JEOL Ltd.

Observation frequency: 395.88 MHz

Pulse width: 6.30 μs

Pulse repeating time: 74.1411 seconds

Number of integrations: 32

Measurement temperature: room temperature (20 to 35° C.)

Reference: 7.24 ppm

Sample tube diameter: 5 mm

From the $^1$H-NMR spectrum, an integrated value ($V_1$) of the peak at which the chemical shift is present in the range of 3.2 ppm or more and 3.8 ppm or less is determined. In addition, for each of the hydrogen atoms of the —CH$_2$— group and the —CH< group bonded to the oxygen atom bonded to the terminal group of the polymer compound, the sum ($V_2$) of integrated values of peaks in the $^1$H-NMR spectrum is determined. Then, from $V_1$ and $V_2$, a ratio of $V_1$ to the sum of $V_1$ and $V_2$ ($=V_1/(V_1+V_2)\times100(\%)$) is determined.

When the integrated value of the peak in the $^1$H-NMR spectrum is determined in the qualitative analysis, two points having no significant signal are determined so as to sandwich the corresponding peak in the ill-NMR spectrum, and each integrated value is calculated using a straight line connecting the two points as a baseline. For example, for the peak in which the chemical shift is present in a range of 3.2 ppm to 3.8 ppm, a straight line connecting two points of 3.2 ppm and 3.8 ppm in the spectrum is used as a baseline. For example, for a peak in which the chemical shift is present in a range of more than 3.8 ppm and 4.0 ppm or less, a straight line connecting two points of 3.8 ppm and 4.0 ppm in the spectrum is used as a baseline.

(1-2) Quantitative Analysis of Polymer Compound

An appropriate amount of the chloroform soluble component is dissolved in deuterated chloroform together with tetrachloroethane (TCE) of $m_r$ (g) measured with an accuracy of ±0.0001 g, and a $^1$H-NMR spectrum is measured. An integrated value ($S_a$) of the peak in which the chemical shift is present in the range of 3.2 to 3.8 ppm and an integrated value ($S_r$) of a peak derived from TCE are determined, and mass-based content $C_n$ (ppm) of the polymer compound in the negative electrode material is determined from the following formula.

$$C_n=S_a/S_r\times N_r/N_a\times M_a/M_r\times m_r/m\times1{,}000{,}000$$

(wherein $M_a$ is a molecular weight of a structure showing a peak in a chemical shift range of 3.2 to 3.8 ppm (more specifically, a molecular weight of the repeating structure of oxy $C_{2-4}$ alkylene units), and $N_a$ is the number of hydrogen atoms bonded to a carbon atom of a main chain of the repeating structure. $N_r$ and $M_r$ are the number of hydrogen contained in a molecule of reference substance and the molecular weight of the reference substance, respectively, and m (g) is the mass of the negative electrode material used for extraction.)

Since the reference substance in this analysis is TCE, $N_r=2$ and $M_r=168$. In addition, m=100.

For example, when the polymer compound is polypropylene glycol, $M_a$ is 58, and $N_a$ is 3. When the polymer compound is polyethylene glycol, $M_a$ is 44, and $N_a$ is 4. In the case of a copolymer, $N_a$ is a value obtained by averaging $N_a$ values of each monomer unit using a molar ratio (mol %) of each monomer unit contained in the repeating structure, and $M_a$ is determined according to the type of each monomer unit.

In the quantitative analysis, the integrated value of the peak in the $^1$H-NMR spectrum is determined using data processing software "ALICE" manufactured by JEOL Ltd.

(1-3) Mn Measurement of Polymer Compound

GPC Measurement of the polymer compound is performed using the following apparatus under the following conditions. Separately, a calibration curve (standard curve) is prepared from a plot of Mn of the standard substance and elution time. The Mn of the polymer compound is calculated based on the standard curve and the GPC measurement result of the polymer compound.

Analysis system: 20A system (manufactured by Shimadzu Corporation)

Column: two columns of GPC KF-805L (manufactured by Shodex) connected in series

Column temperature: 30° C.

Mobile phase: tetrahydrofuran

Flow rate: 1 mL/min.

Concentration: 0.20% by mass

Injection amount: 10 μL

Standard substance: polyethylene glycol (Mn=2,000,000, 200,000, 20,000, 2,000, 200)

Detector: differential refractive index detector (Shodex RI-201H, manufactured by Shodex)

(2) Analysis of Carbonaceous Material (2-1) Separation and Quantitative Determination of Carbonaceous Material The lead-acid battery in the fully charged state is disassembled, the formed negative electrode plate is taken out, sulfuric acid is removed by washing with water, and the negative electrode plate is dried under vacuum or under an inert gas atmosphere. Next, the negative electrode material is collected from the dried negative electrode plate and pulverized. 30 mL of a nitric acid aqueous solution having a concentration of 60% by mass is added per 5 g of the pulverized sample, and the mixture is heated at 70° C. 10 g of disodium ethylenediaminetetraacetate, 30 mL of ammonia water having a concentration of 28% by mass, and 100 mL of water are added per 5 g of the pulverized sample, and heating is continued to dissolve a soluble component. The sample thus pretreated is collected by filtration. The collected sample is passed through a sieve with an opening of 500 μm to remove components having a large size such as a reinforcing material, and components having passed through the sieve are collected as the carbonaceous materials.

The content $C_c$ of the carbonaceous material in the negative electrode material is determined by measuring the mass of each carbonaceous material separated by the above procedure and calculating a ratio (% by mass) of a total of the mass in the pulverized sample.

When the first carbonaceous material and the second carbonaceous material are separated, the separation is performed by the following procedure.

When the collected carbonaceous material is sieved by a wet method using a sieve with an opening of 32 μm, the carbonaceous material remaining on the sieve without passing through a sieve mesh is defined as the first carbonaceous material, and the carbonaceous material passing through the sieve mesh is defined as the second carbonaceous material. That is, the particle size of each carbonaceous material is based on the size of the mesh opening of the sieve. For wet sieving, JIS Z 8815:1994 can be referred to.

Specifically, the carbonaceous material is placed on a sieve having an opening of 32 μm, and sieved by gently shaking the sieve for 5 minutes while sprinkling ion-exchange water. The first carbonaceous material remaining on the sieve is collected from the sieve by pouring ion-exchange water over the sieve, and separated from the ion-exchange water by filtration. The second carbonaceous material that has passed through the sieve is collected by filtration using a membrane filter (opening: 0.1 μm) made of nitrocellulose. The collected first carbonaceous material and the collected second carbonaceous material are each dried at a temperature of 100° C. for 2 hours. As the sieve having an opening of 32 μm, a sieve provided with a sieve mesh having a nominal opening of 32 μm, which is defined in JIS Z 8801-1:2006, is used.

The ratio of the second carbonaceous material in the whole carbonaceous material is determined by calculating a ratio (% by mass) of the measured mass of the second carbonaceous material in the mass of the carbonaceous material.

(2-2) BET Specific Surface Area $S_c$ of Carbonaceous Material

The BET specific surface area $S_c$ of the carbonaceous material is determined using a BET equation by the gas adsorption method using the carbonaceous material separated by the procedure of (2-1) described above. The carbonaceous material is pretreated by heating at a temperature of 150° C. for 1 hour in a nitrogen flow for moisture removal. Using the pretreated carbonaceous material, the BET specific surface area of the carbonaceous material is determined by the following apparatus under the following conditions.

Measuring apparatus: TriStar 3000 manufactured by Micromeritics Instrument Corp.

Adsorption gas: nitrogen gas having a purity of 99.99% or more

Adsorption temperature: liquid nitrogen boiling point temperature (77 K)

Method for calculating BET specific surface area: in accordance with 7.2 of JIS Z 8830:2013

(3) BET Specific Surface Area $S_n$ of Negative Electrode Material

The BET specific surface area $S_n$ of the negative electrode material is determined using the BET equation by the gas adsorption method using the sample A. The negative electrode material is pretreated by heating at a temperature of 150° C. for 1 hour in a nitrogen flow. Using the pretreated negative electrode material, the BET specific surface area $S_n$ of the negative electrode material is determined using the apparatus and conditions similar to those in (2-2).

(4) Analysis of Organic Expander (4-1) Qualitative Analysis of Organic Expander in Negative Electrode Material Sample A is immersed in a 1 mol/L sodium hydroxide (NaOH) aqueous solution to extract the organic expander. Next, the first organic expander and the second organic expander are separated from the extract. For each separated material containing each organic expander, insoluble components are removed by filtration, and the obtained solution is desalted, then concentrated, and dried. The desalination is performed by using a desalination column, by causing the solution to pass through an ion-exchange membrane, or by placing the solution in a dialysis tube and immersing the solution in distilled water. The solution is dried to obtain a powder sample (hereinafter, also referred to as a powder sample B) of the organic expander.

A type of the organic expander is specified using a combination of information obtained from an infrared spectroscopic spectrum measured using the powder sample of the organic expander obtained as described above, an ultraviolet-visible absorption spectrum measured by an ultraviolet-visible absorption spectrometer after the powder sample is diluted with distilled water or the like, an NMR spectrum of a solution obtained by dissolution with a predetermined solvent such as heavy water, and the like.

The first organic expander and the second organic expander are separated from the extract as follows. First, the extract is measured by infrared spectroscopy, NMR, and/or GC-MS to determine whether or not a plurality of types of organic expanders are contained. Next, a molecular weight distribution is measured by GPC analysis of the extract, and if the plurality of types of organic expanders can be separated by molecular weight, the organic expander is separated by column chromatography based on a difference in molecular weight. When it is difficult to separate the organic expander due to the difference in molecular weight, one of the organic expanders is separated by a precipitation separation method using a difference in solubility that varies depending on the type of the functional group and/or the amount of the functional group of the organic expander. Specifically, an aqueous sulfuric acid solution is added dropwise to a mixture obtained by dissolving the extract in an NaOH aqueous solution to adjust the pH of the mixture, thereby aggregating and separating one of the organic expanders. The insoluble component is removed by filtration as described above from the separated material dissolved again in the NaOH aqueous solution. The remaining solution after separating one of the organic expanders is concentrated. The obtained concentrate contains the other organic expander, and the insoluble component is removed from the concentrate by filtration as described above.

(4-2) Quantitative Determination of Content of Organic Expander in Negative Electrode Material Similarly to (4-1) above, for each separated material containing the organic expander, a solution is obtained after removing the insoluble component by filtration. The ultraviolet-visible absorption spectrum of each obtained solution is measured. The content of each organic expander in the negative electrode material is determined using an intensity of a characteristic peak of each organic expander and a calibration curve prepared in advance.

When a lead-acid battery in which the content of the organic expander is unknown is obtained and the content of the organic expander is measured, a structural formula of the organic expander cannot be strictly specified, so that the same organic expander may not be used for the calibration curve. In this case, the content of the organic expander is measured using the ultraviolet-visible absorption spectrum by creating a calibration curve using the organic expander extracted from the negative electrode of the battery and a separately available organic polymer in which the ultraviolet-visible absorption spectrum, the infrared spectroscopic spectrum, the NMR spectrum, and the like exhibit similar shapes.

(4-3) Content of Sulfur Element in Organic Expander

Similarly to (4-1) above, after a powder sample of the organic expander is obtained, sulfur element in 0.1 g of the organic expander is converted into sulfuric acid by an oxygen combustion flask method. At this time, the powder sample is burned in a flask containing an adsorbent to obtain an eluate in which sulfate ions are dissolved in the adsorbent. Next, the eluate is titrated with barium perchlorate using thorin as an indicator to determine the content (C1) of the sulfur element in 0.1 g of the organic expander. Next, C1 is multiplied by 10 to calculate the content (μmol/g) of the sulfur element in the organic expander per 1 g.

(5) Quantitative Determination of Barium Sulfate

An uncrushed initial sample is crushed, 50 ml of nitric acid having a concentration of 20% by mass is added to 10 g of the crushed initial sample, and the mixture is heated for about 20 minutes to dissolve a lead component as lead nitrate. Next, a solution containing lead nitrate is filtered, and solids such as carbonaceous materials and barium sulfate are filtered off.

The obtained solid is dispersed in water to form a dispersion, and then components except for the carbonaceous material and barium sulfate (e.g., reinforcing material) are removed from the dispersion by using a sieve. Next, the dispersion is subjected to suction filtration using a membrane filter with its mass measured in advance, and the membrane filter is dried with the filtered sample in a dryer at 110° C.±5° C. The filtered sample is a mixed sample of the carbonaceous material and barium sulfate. A mass of the mixed sample is measured by subtracting the mass of the membrane filter from the total mass of dried mixed sample and the membrane filter. Thereafter, the dried mixed sample is placed in a crucible together with a membrane filter and is burned and incinerated at 700° C. or higher. The residue remaining is barium oxide. The mass of barium sulfate is determined by converting the mass of barium oxide to the mass of barium sulfate.

(Others)

The negative electrode plate can be formed in such a manner that a negative current collector is coated or filled with a negative electrode paste, which is then cured and dried to prepare a non-formed negative electrode plate, and thereafter, the non-formed negative electrode plate is formed. The negative electrode paste is prepared by adding water and sulfuric acid to lead powder and an organic expander, and various additives as necessary, and kneading the mixture. At the time of curing, it is preferable to cure the non-formed negative electrode plate at a higher temperature than room temperature and high humidity.

The formation can be performed by charging the element in a state where the element including the non-formed negative electrode plate immersed in the electrolyte solution containing sulfuric acid in the container of the lead-acid battery. However, the formation may be performed before the lead-acid battery or the element is assembled. The formation produces spongy lead.

(Positive Electrode Plate)

The positive electrode plate of a lead-acid battery can be classified into a paste type, a clad type, and the like. The paste-type positive electrode plate includes a positive current collector and a positive electrode material. The positive electrode material is held by the positive current collector. In the paste-type positive electrode plate, the positive electrode material is obtained by removing the positive current collector from the positive electrode plate. The positive current collector may be formed by casting lead (Pb) or a lead alloy, or may be formed by processing a lead sheet or a lead alloy sheet. Examples of the processing method include expanding processing and punching processing. It is preferable to use a grid-like current collector as the positive current collector because the positive electrode material is easily supported. The clad-type positive electrode plate includes a plurality of porous tubes, a spine inserted into each tube, a current collector coupling the plurality of spines, a positive electrode material with which a spine inserted tube is filled, and a joint that couples the plurality of tubes. In the clad-type positive electrode plate, the positive electrode material is a material obtained by removing the tube, the spine, the current collector, and the joint. In the clad-type positive electrode plate, the spine and the current collector may be collectively referred to as a positive current collector.

A member such as a mat or a pasting paper may be stuck to the positive electrode plate. Such a member (sticking member) is used integrally with the positive electrode plate and is thus assumed to be included in the positive electrode plate. Also, when the positive electrode plate includes such a member, the positive electrode material is obtained by removing the positive current collector and the sticking member from the positive electrode plate in the paste-type positive electrode plate.

As a lead alloy used for the positive current collector, a Pb—Sb alloy, a Pb—Ca alloy, or a Pb—Ca—S$_n$ alloy are preferred in terms of corrosion resistance and mechanical strength. The positive current collector may include a surface layer. The surface layer and the inner layer of the positive current collector may have different compositions. The surface layer may be formed in a part of the positive current collector. The surface layer may be formed only on the grid portion, only on the lug portion, or only on the frame rib portion of the positive current collector.

The positive electrode material contained in the positive electrode plate contains a positive active material (lead dioxide or lead sulfate) that exhibits a capacity through a redox reaction. The positive electrode material may optionally contain another additive.

A non-formed paste-type positive electrode plate is obtained by filling a positive current collector with a positive electrode paste, and curing and drying the paste. The positive electrode paste is prepared by kneading lead powder, an additive, water, and sulfuric acid. A non-formed clad-type positive electrode plate is formed by filling a porous tube, into which a spine connected by a current collector is inserted with lead powder or a slurry-like lead powder, and joining a plurality of tubes with a joint. Thereafter, the positive electrode plate is obtained by forming the non-formed positive electrode plates. The formation can be performed by charging the element in a state where the element including the non-formed positive electrode plate immersed in the electrolyte solution containing sulfuric acid in the container of the lead-acid battery. However, the formation may be performed before the lead-acid battery or the element is assembled.

The formation can be performed by charging the element in a state where the element including the non-formed positive electrode plate immersed in the electrolyte solution containing sulfuric acid in the container of the lead-acid battery. However, the formation may be performed before the lead-acid battery or the element is assembled.

(Separator)

The separator can be disposed between the negative electrode plate and the positive electrode plate. As the separator, a nonwoven fabric, a microporous membrane, and/or the like are used. The thickness and the number of the separators interposed between the negative electrode plate and the positive electrode plate may be selected in accordance with the distance between the electrodes.

The nonwoven fabric is a mat in which fibers are intertwined without being woven and is mainly made of fibers. In the nonwoven fabric, for example, 60% by mass or more of the nonwoven fabric is formed of fibers. As the fibers, there can be used glass fibers, polymer fibers (polyolefin fiber, acrylic fiber, polyester fiber such as polyethylene terephthalate fiber, etc.), pulp fibers, and the like. Among them, glass fibers are preferable. The nonwoven fabric may contain components in addition to the fibers, such as acid-resistant inorganic powder, a polymer as a binder, and the like.

On the other hand, the microporous film is a porous sheet mainly made of components except for fiber components and is obtained by, for example, extrusion molding a composition containing, for example, a pore-forming additive (polymer powder, oil, and/or the like) into a sheet shape and then removing the pore-forming additive to form pores. The microporous film is preferably made of a material having acid resistance and is preferably composed mainly of a polymer component. As the polymer component, a polyolefin such as polyethylene or polypropylene is preferable.

The separator may be, for example, made of only a nonwoven fabric or made of only a microporous film. The separator may be, when required, a laminate of a nonwoven fabric and a microporous film, a laminate of different or the same kind of materials, or a laminate of different or the same kind of materials in which recesses and projections are engaged to each other.

The separator may have a sheet shape or may be formed in a bag shape. One sheet-like separator may be disposed between the positive electrode plate and the negative electrode plate. Further, the electrode plate may be disposed so as to be sandwiched by one sheet-like separator in a folded state. In this case, the positive electrode plate sandwiched by the folded sheet-like separator and the negative electrode plate sandwiched by the folded sheet-like separator may be overlapped, or one of the positive electrode plate and the negative electrode plate may be sandwiched by the folded sheet-like separator and overlapped with the other electrode plate. Also, the sheet-like separator may be folded into a bellows shape, and the positive electrode plate and the negative electrode plate may be sandwiched by the bellows-shaped separator such that the separator is interposed therebetween. When the separator folded in a bellows shape is used, the separator may be disposed such that the folded portion is along the horizontal direction of the lead-acid battery (e.g., such that the bent portion may be parallel to the horizontal direction), and the separator may be disposed such that the folded portion is along the vertical direction (e.g., such that the bent portion is parallel to the vertical direction). In the separator folded in the bellows shape, recesses are alternately formed on both main surface sides of the separator. Since the lugs are usually formed on the upper portion of the positive electrode plate and the negative electrode plate, when the separator is disposed such that the folded portions are along the horizontal direction of the lead-acid battery, the positive electrode plate and the negative electrode plate are each disposed only in the recess on one main surface side of the separator (i.e., a double separator is interposed between the adjacent positive and negative plates). When the separator is disposed such that the folded portion is along the vertical direction of the lead-acid battery, the positive electrode plate can be housed in the recess on one main surface side, and the negative electrode plate can be housed in the recess on the other main surface side (i.e., the separator can be interposed singly between the adjacent positive and negative plates). When the bag-shaped separator is used, the bag-shaped separator may house the positive electrode plate or may house the negative electrode plate.

In the present specification, the up-down direction of the plate means the up-down direction of the lead-acid battery in the vertical direction.

(Electrolyte Solution)

The electrolyte solution is an aqueous solution containing sulfuric acid and may be gelled as necessary.

The polymer compound may be contained in the electrolyte solution. Similarly to the case of the negative electrode material, the source of the polymer compound contained in the electrolyte solution is not particularly limited.

The concentration of the polymer compound in the electrolyte solution may be, for example, 500 ppm or less, 300 ppm or less, or 200 ppm or less on a mass basis. As described above, even when the amount of the polymer compound contained in the electrolyte solution is small, the amount of overcharge can be reduced, and the deterioration of the charge acceptability and the low temperature HR discharge performance can be suppressed. The concentration of the polymer compound in the electrolyte solution may be 1 ppm or more or 5 ppm or more on a mass basis. These upper limit values and lower limit values can be combined arbitrarily.

The concentration of the polymer compound in the electrolyte solution may be 1 ppm or more and 500 ppm or less, 1 ppm or more and 300 ppm or less, 1 ppm or more and 200 ppm or less, 5 ppm or more and 500 ppm or less, 5 ppm or more and 300 ppm or less, or 5 ppm or more and 200 ppm or less on a mass basis.

It is also preferable that the concentration of the polymer compound in the electrolyte solution is 100 ppm or more. At this time, the polymer compound preferably contains at least a compound having Mn of 1,000 or more and 5,000 or less. Since the polymer compound having Mn of 5,000 or less is easily dissolved in the electrolyte solution and easily moves in the electrolyte solution, the polymer compound moves into the negative electrode material and can further enhance the effect of reducing the amount of overcharge. Since the structural change of the negative active material due to the hydrogen gas is also suppressed, it is also possible to suppress the deterioration of the low temperature HR discharge performance after the high temperature light load test. In the polymer compound having Mn of 1,000 or more, it is considered that the adsorbability to lead is further enhanced, and the effect of reducing the amount of overcharge can be further enhanced. When the lead-acid battery is used for a long period of time, the structural change of the negative active material gradually proceeds, and the polymer compound tends to be easily eluted from the negative electrode plate. However, when the electrolyte solution contains some concentration of polymer compound, elution of the polymer compound from the negative electrode plate can be suppressed, the polymer compound can be retained in the negative electrode material, and the polymer compound can be replenished from the electrolyte solution to the negative electrode plate.

The concentration of the polymer compound in the electrolyte solution may be, for example, 100 ppm or more, may be 200 ppm or more or 500 ppm or more, may be more than 500 ppm, or may be 600 ppm or more on a mass basis. The polymer compound preferably contains at least a compound having Mn of 1,000 or more and 5,000 or less (for example, 4,000 or less or 3,000 or less). When the polymer compound is contained in the negative electrode material and the electrolyte solution contains some concentration of polymer compound, elution of the polymer compound from the negative electrode plate can be suppressed, and the polymer compound can be replenished from the electrolyte solution to the negative electrode plate.

The concentration of the polymer compound in the electrolyte solution may be, for example, 5,000 ppm or less, 4,000 ppm or less, 3,000 ppm or less, 2,500 ppm or less, or 2,400 ppm or less on a mass basis.

The concentration of the polymer compound in the electrolyte solution may be, on a mass basis, 100 ppm or more (or 200 ppm or more) and 5,000 ppm or less, 100 ppm or more (or 200 ppm or more) and 4,000 ppm or less, 100 ppm or more (or 200 ppm or more) and 3,000 ppm or less, 100 ppm or more (or 200 ppm or more) and 2,500 ppm or less, 100 ppm or more (or 200 ppm or more) and 2,400 ppm or less, 500 ppm or more (or more than 500 ppm) and 5,000 ppm or less, 500 ppm or more (or more than 500 ppm) and 4,000 ppm or less, 500 ppm or more (or more than 500 ppm)

and 3,000 ppm or less, 500 ppm or more (or more than 500 ppm) and 2,500 ppm or less, 500 ppm or more (or more than 500 ppm) and 2,400 ppm or less, 600 ppm or more and 5,000 ppm or less (or 4,000 ppm or less), 600 ppm or more and 3,000 ppm or less (or 2,500 ppm or less), or 600 ppm or more and 2,400 ppm or less.

The concentration of the polymer compound in the electrolyte solution is determined for the lead-acid battery in the fully charged state.

Regarding the concentration of the polymer compound in the electrolyte solution, chloroform is added to and mixed with a predetermined amount ($m_1$ (g)) of the electrolyte solution taken out from the formed lead-acid battery in a fully charged state, the mixture is allowed to stand to be separated into two layers, and then only the chloroform layer is taken out. After repeating this operation several times, chloroform is distilled off under reduced pressure to obtain a chloroform soluble content. An appropriate amount of the chloroform soluble component is dissolved in deuterated chloroform together with $0.0212\pm0.0001$ g of TCE, and a ${}^1$H-NMR spectrum is measured. An integrated value ($S_a$) of the peak in which the chemical shift is present in the range of 3.2 to 3.8 ppm and an integrated value ($S_r$) of a peak derived from TCE are determined, and content $C_e$ of the polymer compound in the electrolyte solution is determined from the following formula.

$$C_e = S_a/S_r \times N_r/N_a \times M_d/M_r \times m_r/m_1 \times 1{,}000{,}000$$

(wherein $M_a$ and $N_a$ are the same as described above.)

The electrolyte solution may contain cations (e.g., metal cations such as sodium ion, lithium ion, magnesium ion, and/or aluminum ion) and/or anions (e.g., anions other than sulfate anions such as phosphate ions) as necessary.

The specific gravity of the electrolyte solution in the lead-acid battery in the fully charged state at 20° C. is, for example, 1.20 or more and may be 1.25 or more. The specific gravity of the electrolyte solution at 20° C. is 1.35 or less and preferably 1.32 or less. These lower limit values and upper limit values can be combined arbitrarily. The specific gravity of the electrolyte solution at 20° C. may be 1.20 or more and 1.35 or less, 1.20 or more and 1.32 or less, 1.25 or more and 1.35 or less, or 1.25 or more and 1.32 or less.

The lead-acid battery can be obtained by a production method including a step of assembling a lead-acid battery by housing a positive electrode plate, a negative electrode plate, and an electrolyte solution in a container. In the assembly process of the lead-acid battery, the separator is usually disposed so as to be interposed between the positive electrode plate and the negative electrode plate. The assembly process of the lead-acid battery may include a step of forming the positive electrode plate and/or the negative electrode plate as necessary after the step of housing the positive electrode plate, the negative electrode plate, and the electrolyte solution in the container. The positive electrode plate, the negative electrode plate, the electrolyte solution, and the separator are each prepared before being housed in the container.

FIG. 1 shows an appearance of an example of a lead-acid battery according to an embodiment of the present invention.

A lead-acid battery 1 includes a container 12 that houses an element 11 and an electrolyte solution (not shown). The inside of the container 12 is partitioned by partitions 13 into a plurality of cell chambers 14. Each of the cell chambers 14 contains one element 11. An opening of the container 12 is closed with a lid 15 having a negative electrode terminal 16 and a positive electrode terminal 17. The lid 15 is provided with a vent plug 18 for each cell chamber. At the time of water addition, the vent plug 18 is removed to supply a water addition liquid. The vent plug 18 may have a function of discharging gas generated in the cell chamber 14 to the outside of the battery.

The element 11 is configured by laminating a plurality of negative electrode plates 2 and positive electrode plates 3 with a separator 4 interposed therebetween. Here, the bag-shaped separator 4 housing the negative electrode plate 2 is shown, but the form of the separator is not particularly limited. In the cell chamber 14 located at one end of the container 12, a negative electrode shelf portion 6 for connecting the plurality of negative electrode plates 2 in parallel is connected to a penetrating connection body 8, and a positive electrode shelf portion 5 for connecting the plurality of positive electrode plates 3 in parallel is connected to a positive pole 7. The positive pole 7 is connected to the positive electrode terminal 17 outside the lid 15. In the cell chamber 14 located at the other end of the container 12, a negative pole 9 is connected to the negative electrode shelf portion 6, and the penetrating connection body 8 is connected to the positive electrode shelf portion 5. The negative pole 9 is connected to the negative electrode terminal 16 outside the lid 15. Each of the penetrating connection bodies 8 passes through a through-hole provided in the partition 13 to connect the elements 11 of the adjacent cell chambers 14 in series.

The positive electrode shelf portion 5 is formed by welding the lugs, provided on the upper portions of the respective positive electrode plates 3, to each other by a cast-on-strap method or a burning method. The negative electrode shelf portion 6 is also formed by welding the lugs, provided on the upper portions of the respective negative electrode plates 2, to each other in accordance with the case of the positive electrode shelf portion 5.

The lid 15 of the lead-acid battery has a single structure (single lid), but is not limited to the illustrated examples. The lid 15 may have, for example, a double structure including an inner lid and an outer lid (or an upper lid). The lid having the double structure may have a reflux structure between the inner lid and the outer lid for returning the electrolyte solution into the battery (inside the inner lid) through a reflux port provided in the inner lid.

The lead-acid battery according to one aspect of the present invention will be described below.

(1) A lead-acid battery including a positive electrode plate, a negative electrode plate, and an electrolyte solution, in which the negative electrode plate includes a negative electrode material, the negative electrode material contains a polymer compound, the polymer compound has a peak in a range of 3.2 ppm or more and 3.8 ppm or less in a chemical shift of ${}^1$H-NMR spectrum, and a ratio: $C_n/S_n$ of a content $C_n$ of the polymer compound in the negative electrode material to a specific surface area $S_n$ of the negative electrode material is 25 ppm·m${}^{-2}$·g or more.

(2) In (1) above, the polymer compound may contain an oxygen atom bonded to a terminal group and a —CH$_2$— group and/or a —CH< group bonded to the oxygen atom, and in the ${}^1$H-NMR spectrum, a ratio of an integrated value of the peak to a sum of the integrated value of the peak, an integrated value of a peak of a hydrogen atom of the —CH$_2$— group, and an integral value of a peak of a hydrogen atom of the —CH< group may be 50% or more, 80% or more, 85% or more, or 90% or more.

(3) In (1) or (2) above, the polymer compound may contain a repeating structure of oxy $C_{2-4}$ alkylene units.

(4) A lead-acid battery including a positive electrode plate, a negative electrode plate, and an electrolyte solution, in which the negative electrode plate includes a negative electrode material, the negative electrode material contains a polymer compound having a repeating structure of oxy $C_{2-4}$ alkylene units, and a ratio: $C_n/S_n$ of a content $C_n$ of the polymer compound in the negative electrode material to a specific surface area $S_n$ of the negative electrode material is 25 ppm·m$^{-2}$·g or more.

(5) In (3) or (4) above, the polymer compound may contain at least one selected from the group consisting of an etherified product of a hydroxy compound having a repeating structure of the oxy $C_{2-4}$ alkylene units and an esterified product of a hydroxy compound having the repeating structure of the oxy $C_{2-4}$ alkylene units, and the hydroxy compound may be at least one selected from the group consisting of a poly $C_{2-4}$ alkylene glycol, a copolymer having a repeating structure of oxy $C_{2-4}$ alkylene, and a $C_{2-4}$ alkylene oxide adduct of a polyol.

(6) A lead-acid battery including a positive electrode plate, a negative electrode plate, and an electrolyte solution, in which the negative electrode plate includes a negative electrode material, the negative electrode material contains a polymer compound, a ratio: $C_n/S_n$ of a content $C_n$ of the polymer compound in the negative electrode material to a specific surface area $S_n$ of the negative electrode material is 25 ppm·m$^{-2}$·g or more, the polymer compound contains at least one selected from the group consisting of an etherified product of a hydroxy compound having a repeating structure of oxy $C_{2-4}$ alkylene units and an esterified product of a hydroxy compound having the repeating structure of the oxy $C_{2-4}$ alkylene units, and the hydroxy compound is at least one selected from the group consisting of a poly $C_{2-4}$ alkylene glycol, a copolymer having a repeating structure of oxy $C_{2-4}$ alkylene, and a $C_{2-4}$ alkylene oxide adduct of a polyol.

(7) In (5) or (6) above, the etherified product may have an —OR$^2$ group (wherein R$^2$ is an organic group) in which an —OH group at a terminal of at least a part of the hydroxy compound is etherified, and the organic group R$^2$ may be a hydrocarbon group.

(8) In (5) or (6) above, the esterified product may have an —OC(=O)—R$^3$ group (wherein R$^3$ is an organic group) in which an —OH group at a terminal of at least a part of the hydroxy compound is esterified, and the organic group R$^3$ may be a hydrocarbon group.

(9) In (7) or (8) above, the hydrocarbon group may be an aliphatic hydrocarbon group.

(10) In (9) above, the aliphatic hydrocarbon group may be either linear or branched.

(11) In (9) or (10) above, the number of carbon atoms of the aliphatic hydrocarbon group is, for example, 30 or less, and may be 26 or less or 22 or less, 20 or less or 16 or less, 14 or less or 10 or less, or 8 or less or 6 or less.

(12) In any one of (9) to (11) above, the aliphatic hydrocarbon group may be an alkyl group or an alkenyl group.

(13) In (12) above, the number of carbon atoms of the alkyl group may be 1 or more, and the number of carbon atoms of the alkenyl group may be 2 or more.

(14) In (12) or (13) above, the alkyl group may be at least one selected from the group consisting of methyl, ethyl, n-propyl, i-propyl, n-butyl, i-butyl, s-butyl, t-butyl, n-pentyl, neopentyl, i-pentyl, s-pentyl, 3-pentyl, t-pentyl, n-hexyl, 2-ethylhexyl, n-octyl, n-decyl, i-decyl, lauryl, myristyl, cetyl, stearyl, and behenyl.

(15) In (12) or (13) above, the alkenyl group may be, for example, a $C_{2-30}$ alkenyl group or a $C_{2-26}$ alkenyl group, a $C_{2-22}$ alkenyl group or a $C_{2-20}$ alkenyl group, or a $C_{10-20}$ alkenyl group.

(16) In (12), (13), or (15) above, the alkenyl group may be at least one selected from the group consisting of vinyl, 1-propenyl, allyl, palmitoleyl, and oleyl.

(17) In any one of (3) to (16) above, the repeating structure of the oxy $C_{2-4}$ alkylene units may contain at least a repeating structure of oxypropylene units.

(18) In (17) above, a proportion of the oxypropylene unit in the polymer compound (1 molecule) may be 5 mol % or more, 10 mol % or more, or 20 mol % or more.

(19) In any one of (1) to (18) above, the polymer compound may contain a compound having Mn of 500 or more, a compound having Mn of 600 or more, or a compound having Mn of 1,000 or more.

(20) In (19) above, the Mn of the compound may be 20,000 or less, 15,000 or less, 10,000 or less, 5,000 or less, 4,000 or less, or 3,000 or less.

(21) In any one of (1) to (18) above, the polymer compound may contain at least a compound having Mn of 1,000 or more.

(22) In (21) above, the Mn of the compound may be 1,000 or more and 20,000 or less, 1,000 or more and 15,000 or less, 1,000 or more and 10,000 or less, 1000 or more and 5,000 or less, 1,000 or more and 4,000 or less, or 1,000 or more and 3,000 or less.

(23) In any one of (1) to (22) above, the ratio $C_n/S_n$ is 25 ppm·m$^{-2}$·g or more, 26 ppm·m$^{-2}$·g or more, 50 ppm·m$^{-2}$·g or more, or 90 ppm·m$^{-2}$·g or more.

(24) In any one of (1) to (23) above, the ratio $C_n/S_n$ may be 800 ppm·m$^{-2}$·g or less, 730 ppm·m$^{-2}$·g or less, 600 ppm·m$^{-2}$·g or less, 450 ppm·m$^{-2}$·g or less, or 410 ppm·m$^{-2}$·g or less.

(25) In any one of (1) to (24) above, the content $C_n$ of the polymer compound in the negative electrode material may be more than 8 ppm, and may be 10 ppm or more, 13 ppm or more, 15 ppm or more, 30 ppm or more, 40 ppm or more, 50 ppm or more, 80 ppm or more, or 100 ppm or more on a mass basis.

(26) In any one of (1) to (25) above, the content $C_n$ of the polymer compound in the negative electrode material may be 3,000 ppm or less, 2,500 ppm or less, 2,000 ppm or less, 1,000 ppm or less, 600 ppm or less, 500 ppm or less, 300 ppm or less, or 200 ppm or less.

(27) In any one of (1) to (26) above, the specific surface area $S_n$ of the negative electrode material may be 0.3 m$^2$·g$^{-1}$ or more, 0.5 m$^2$·g$^{-1}$ or more, or 0.7 m$^2$·g$^{-1}$ or more.

(28) In any one of (1) to (27) above, the specific surface area $S_n$ of the negative electrode material may be 4 m$^2$·g$^1$ or less, 3.5 m$^2$·g$^{-1}$ or less, 2.5 m$^2$·g$^1$ or less, 2 m$^2$·g$^1$ or less, or 1.5 m$^2$·g$^{-1}$ or less.

(29) In any one of (1) to (28) above, the negative electrode material may contain a carbonaceous material.

(30) In (29) above, a content $C_c$ of the carbonaceous material in the negative electrode material may be 0.01% by mass or more, 0.1% by mass or more, 0.2% by mass or more, 0.3% by mass or more, or 0.45% by mass or more.

(31) In (29) or (30) above, the content $C_c$ of the carbonaceous material in the negative electrode material may be 5% by mass or less, 3.5% by mass or less, or 3% by mass or less.

(32) In any one of (29) to (31) above, the carbonaceous material may include a second carbonaceous material having a particle size of less than 32 µm.

(33) In (32) above, a ratio of the second carbonaceous material in the whole carbonaceous material may be 10% by mass or more, 40% by mass or more, 50% by mass or more, or 60% by mass or more.

(34) In (32) or (33) above, the ratio of the second carbonaceous material in the whole carbonaceous material may be 100% by mass or less or 90% by mass or less.

(35) In any one of (1) to (34) above, the negative electrode material may further contain an organic expander.

(36) In (35) above, the organic expander (or the negative electrode material) may contain a first organic expander having a sulfur element content of 2,000 µmol/g or more or 3,000 µmol/g or more.

(37) In (36) above, the sulfur element content of the first organic expander may be 9,000 µmol/g or less, 8,000 µmol/g or less, or 7,000 µmol/g or less.

(38) In (36) or (37) above, the first organic expander may contain a condensate containing a unit of an aromatic compound having a sulfur-containing group, and the condensate may contain, as the unit of the aromatic compound, at least one selected from the group consisting of a unit of a bisarene compound and a unit of a monocyclic aromatic compound.

(39) In (38) above, the condensate may contain the unit of the bisarene compound and the unit of the monocyclic aromatic compound

(40) In (38) or (39) above, the unit of the monocyclic aromatic compound may include a unit of a hydroxyarene compound.

(41) In (38) above, the sulfur-containing group may contain at least one selected from the group consisting of a sulfonic acid group and a sulfonyl group.

(42) In (35) above, the organic expander (or the negative electrode material) may contain a second organic expander having a sulfur element content of less than 2,000 µmol/g (or 1,000 µmol/g or less or 800 µmol/g or less).

(43) In any one of (36) to (41) above, the organic expander (or the negative electrode material) may further contain a second organic expander having a sulfur element content of less than 2,000 µmol/g (or 1,000 µmol/g or less or 800 µmol/g or less).

(44) In (42) or (43) above, the sulfur element content of the second organic expander may be 400 µmol/g or more.

(45) In (43) above, a ratio of the first organic expander to a total amount of the first organic expander and the second organic expander may be 20% by mass or more or 25% by mass or more.

(46) In (43) or (45) above, the ratio of the first organic expander to the total amount of the first organic expander and the second organic expander may be 80% by mass or less or 75% by mass or less.

(47) In any one of (35) to (46) above, the content of the organic expander contained in the negative electrode material may be 0.01% by mass or more or 0.05% by mass or more.

(48) In any one of (35) to (47) above, the content of the organic expander contained in the negative electrode material may be 1.0% by mass or less or 0.5% by mass or less.

(49) In any one of (1) to (48) above, the electrolyte solution may contain the polymer compound.

(50) In (49) above, a concentration of the polymer compound in the electrolyte solution may be 500 ppm or less, 300 ppm or less, or 200 ppm or less on a mass basis.

(51) In (49) or (50) above, the concentration of the polymer compound in the electrolyte solution may be 1 ppm or more, or 5 ppm or more on a mass basis.

(52) In (49) above, the concentration of the polymer compound in the electrolyte solution may be 100 ppm or more, may be 200 ppm or more or 500 ppm or more, may be more than 500 ppm, or may be 600 ppm or more on a mass basis.

(53) In (52) above, the concentration of the polymer compound in the electrolyte solution may be 5,000 ppm or less, 4,000 ppm or less, 3,000 ppm or less, 2,500 ppm or less, or 2,400 ppm or less on a mass basis.

(54) In (52) or (53) above, the polymer compound may contain at least a compound having Mn of 500 or more (or 600 or more, preferably 1,000 or more).

(55) In (54) above, the Mn of the compound may be 5,000 or less, 4,000 or less, or 3,000 or less.

(56) In any one of (1) to (55) above, the negative electrode material may contain barium sulfate.

(57) In (56) above, the content of the barium sulfate in the negative electrode material may be 0.05% by mass or more or 0.10% by mass or more.

(58) In (56) or (57) above, the content of barium sulfate in the negative electrode material may be 3% by mass or less or 2% by mass or less.

EXAMPLE

Hereinafter, the present invention will be specifically described on the basis of examples and comparative examples, but the present invention is not limited to the following examples.

<<Lead-Acid Batteries E1 to E12 and R1>>

(1) Preparation of Lead-Acid Battery (a) Preparation of Negative Electrode Plate A lead powder as a raw material, barium sulfate, a carbonaceous material, a polymer compound (polypropylene glycol, Mn=2,000), and an organic expander e1 are mixed with an appropriate amount of a sulfuric acid aqueous solution to obtain a negative electrode paste. At this time, the components are mixed so that the ratio $C_n/S_n$ and the content $C_c$ of the carbonaceous material in the negative electrode material, which is determined by the procedure described above, is the value shown in Table 1, the content of barium sulfate is 0.6% by mass, and the content of the organic expander is 0.1% by mass. The ratio $C_n/S_n$ is adjusted by adjusting the specific surface area $S_n$ of the negative electrode material and the content $C_n$ of the polymer compound in the negative electrode material, which are determined by the procedure described above. A mesh portion of an expanded grid made of a Pb—Ca—$S_n$ alloy is filled with the negative electrode paste to be obtained, which is then cured and dried to obtain a non-formed negative electrode plate. As the organic expander e1, a condensate of bisphenol compound having sulfonic acid group introduced and formaldehyde (sulfur element content: 5,000 µmol/g, Mw=9,600) is used. In the lead-acid battery R1, the negative electrode plate is prepared without using the polymer compound, and in the lead-acid battery E12, the negative electrode plate is prepared without using the carbonaceous material.

(b) Preparation of Positive Electrode Plate

Lead powder as raw material is mixed with a sulfuric acid aqueous solution to obtain a positive electrode paste. A mesh portion of an expanded grid made of a Pb—Ca—$S_n$ alloy is filled with the positive electrode paste, which is then cured and dried to obtain a non-formed positive electrode plate.

(c) Preparation of Test Battery

A test battery has a rated voltage of 2 V and a rated 5-hour rate capacity of 32 Ah. An element of the test battery includes seven positive electrode plates and seven negative electrode plates. The negative electrode plate is housed in a bag-shaped separator formed of a polyethylene microporous film, and alternately stacked with the positive electrode plate to form the element. The element is housed in a polypropylene container together with an electrolyte solution (sulfuric acid aqueous solution), and subjected to formation in the container to prepare a flooded-type lead-acid battery. The specific gravity of the electrolyte solution after formation is 1.28 (in terms of 20° C.). In the lead-acid batteries E1 to E11, the concentration of the polymer compound in the electrolyte solution determined by the procedure described above is 300 ppm or less.

In the $^1$H-NMR spectrum of the polymer compound measured by the procedure described above, a peak derived from —$CH_2$— of the oxypropylene unit is observed in a chemical shift range of 3.2 ppm or more and 3.42 ppm or less, and a peak derived from —CH< and —$CH_2$— of the oxypropylene unit is observed in a chemical shift range of more than 3.42 ppm and 3.8 ppm or less. In addition, in the $^1$H-NMR spectrum, a ratio of an integrated value of the peak of 3.2 ppm to 3.8 ppm to the sum of the integrated value of this peak, an integrated value of a peak of hydrogen atoms temperature light load test. The amount of overcharge (amount of charge-discharge capacity) in each cycle up to 1220 cycles is summed and averaged to obtain the amount of overcharge (Ah) per cycle. The amount of overcharge is evaluated by a ratio (%) when the amount of overcharge (Ah) per cycle of the lead-acid battery R1 is 100.

Discharge: 25 A, 1 minute

Charge: 2.47 V/cell, 25 A, 10 minutes

Water tank temperature: 75° C.±3° C.

(b) Charge Acceptability

A 10 second electric quantity is measured using the test battery after full charge. Specifically, the test battery is discharged at 6.4 A for 30 minutes and left for 16 hours. Thereafter, the test battery is charged at a constant voltage of 2.42 V/cell while the upper limit of the current is 200 A, and an integrated electric quantity for 10 seconds (10 second electric quantity) at this time is measured. Both operations are performed in a water tank at 25° C.

(c) Low Temperature HR Discharge Performance after Light Load Test

The test battery after full charge after the high temperature light load test in (a) above is discharged at a discharge current of 150 A at −15° C.±1° C. until the terminal voltage reaches 1.0 V/cell, and a discharge time (low temperature HR discharge duration time after light load test) (s) at this time is obtained. The longer the discharge duration time, the better the low temperature HR discharge performance. The low temperature HR discharge performance of each battery is evaluated by a ratio (%) when the discharge duration time of the lead-acid battery R1 is 100.

The results of the lead-acid batteries E1 to E12 and R1 are shown in Table 1.

TABLE 1

| Battery No. | Carbonaceous material | | Specific surface area $S_n$ of negative electrode material ($m^2 \cdot g^{-1}$) | Polymer compound | | Amount of overcharge (%) | Charge acceptability (%) | Low temperature HR discharge performance (%) |
|---|---|---|---|---|---|---|---|---|
| | Specific surface area $S_c$ ($m^2 \cdot g^{-1}$) | Content in negative electrode material (mass %) | | Content $C_n$ in negative electrode material (mass ppm) | Ratio $C_n/S_n$ (mass ppm $\cdot m^{-2} \cdot$ g) | | | |
| R1 | 70 | 0.3 | 0.71 | 0 | 0 | 100 | 100 | 100 |
| E1 | 70 | 0.3 | 0.71 | 200 | 282 | 62 | 84 | 125 |
| E2 | 70 | 0.6 | 0.92 | 200 | 217 | 68 | 95 | 127 |
| E3 | 2 | 0.3 | 0.506 | 50 | 99 | 87 | 93 | 123 |
| E4 | 2 | 1 | 0.52 | 200 | 385 | 49 | 87 | 113 |
| E5 | 130 | 0.3 | 0.89 | 100 | 112 | 81 | 92 | 125 |
| E6 | 130 | 0.5 | 1.15 | 500 | 435 | 41 | 85 | 104 |
| E7 | 25 | 0.3 | 0.575 | 15 | 26 | 95 | 97 | 107 |
| E8 | 25 | 0.8 | 0.7 | 200 | 286 | 55 | 91 | 121 |
| E9 | 650 | 0.3 | 2.45 | 1000 | 408 | 44 | 77 | 110 |
| E10 | 650 | 0.45 | 3.425 | 2000 | 584 | 36 | 83 | 88 |
| E11 | 650 | 0.45 | 3.425 | 2500 | 730 | 31 | 81 | 16 |
| E12 | — | 0 | 0.5 | 20 | 40 | 90 | 93 | 112 | of the —$CH_2$— group bonded to the oxygen atom, and an integrated value of a peak of a hydrogen atom of the —CH< group bonded to the oxygen atom is 98.1%.

(2) Evaluation (a) Amount of Overcharge

Using the lead-acid battery, evaluation is performed under the following conditions.

In order to set a more overcharge condition than the normal 4-10 min test specified in JIS D 5301, a test of 1 minute of discharge and 10 minutes of charge (1-10 min test) is performed at 75° C.±3° C. (high temperature light load test). The high temperature light load test is performed by repeating 1220 cycles of charge and discharge in the high As shown in Table 1, when the negative electrode material contains the polymer compound and the ratio $C_n/S_n$ is 25 ppm·$m^{-2}$·g or more, it is possible to suppress the deterioration of the charge acceptability while reducing the amount of overcharge. Even when the amount of overcharge is reduced to the order of 30% or the order of 40%, high charge acceptability of 77% or more can be secured. It is considered that the amount of overcharge is reduced because the lead surface is covered by adsorption of the polymer compound, so that the hydrogen overvoltage in the negative electrode plate is increased. It is considered that the deterioration of the charge acceptability is suppressed because the lead surface is thinly covered with the polymer compound, so that elution of lead sulfate is hardly inhibited. It is considered that the deterioration of the charge acceptability is also suppressed by the fact that uneven distribution of the polymer compound in the lead pores is suppressed and ions easily move.

Figure 2:
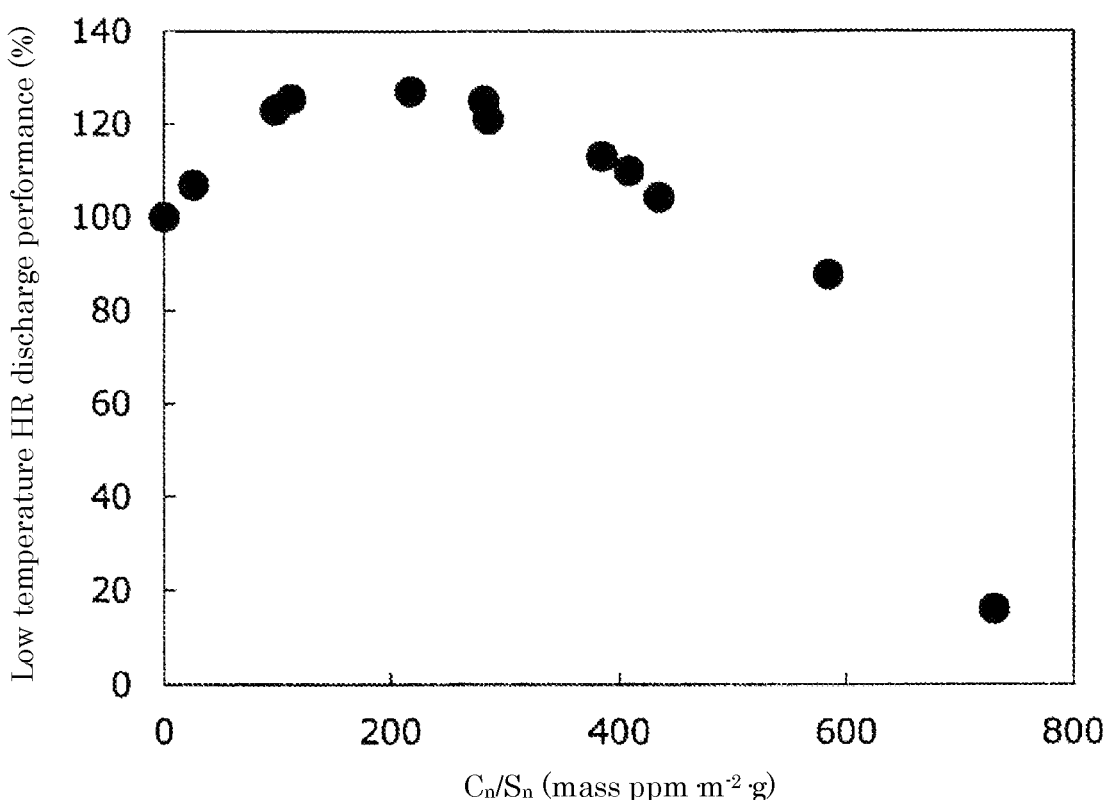
FIG. 2 is a graph showing a relationship between a ratio $C_n/S_n$ and low temperature high rate (HR) discharge performance in Table 1.

A relationship between the ratio $C_n/S_n$ and the low temperature HR discharge performance in Table 1 is shown in FIG. 2. As shown in Table 1 and FIG. 2, in the lead-acid batteries E1 to E9, unexpectedly high low temperature HR discharge performance is obtained although the negative electrode material contains the polymer compound. This is considered to be because the uneven distribution of the polymer compound in the pores is suppressed, so that ions easily move, the generation of hydrogen gas during overcharge is suppressed, and the structural change of the negative active material due to the collision of hydrogen gas is reduced. When the lead surface is excessively covered with the polymer compound, the low temperature HR discharge performance tends to be deteriorated. Thus, the ratio $C_n/S_n$ is preferably 450 ppm·m$^{-2}$·g or less, and more preferably 410 ppm·m$^{-2}$·g or less from the viewpoint of securing higher low temperature HR discharge performance.

Figure 3:
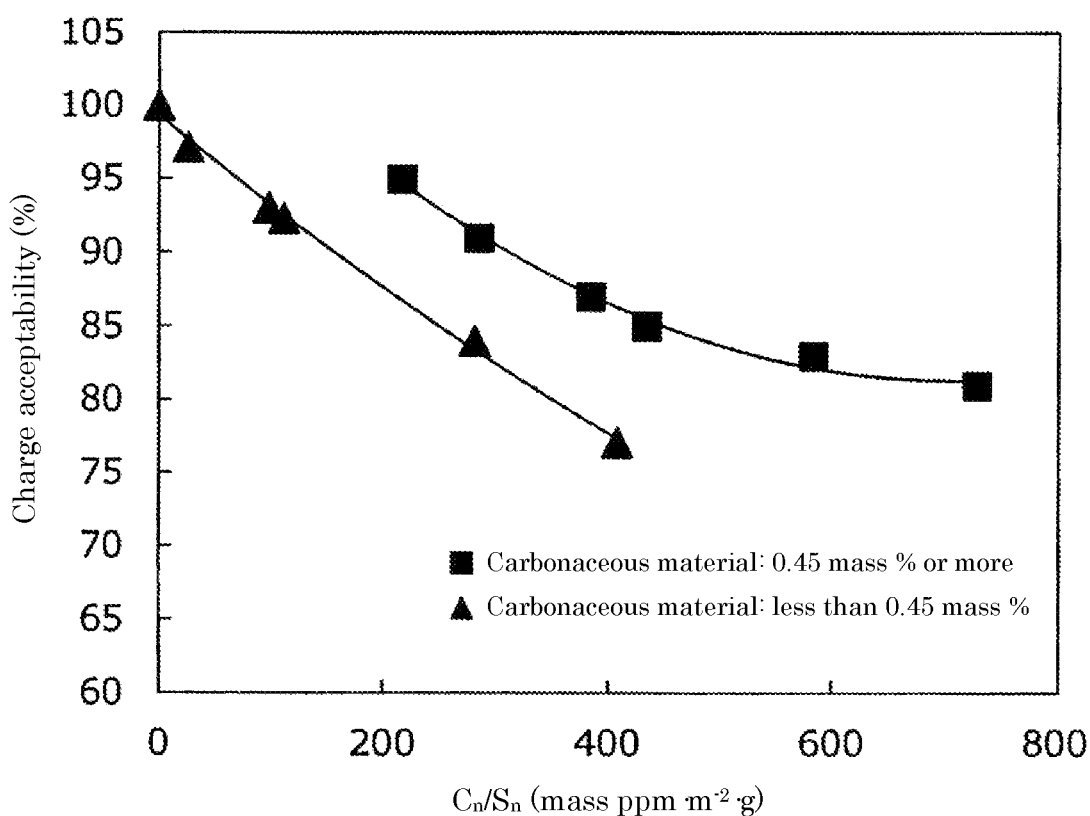
FIG. 3 is a graph showing a relationship between the ratio $C_n/S_n$ and charge acceptability in Table 1.
Figure 4:
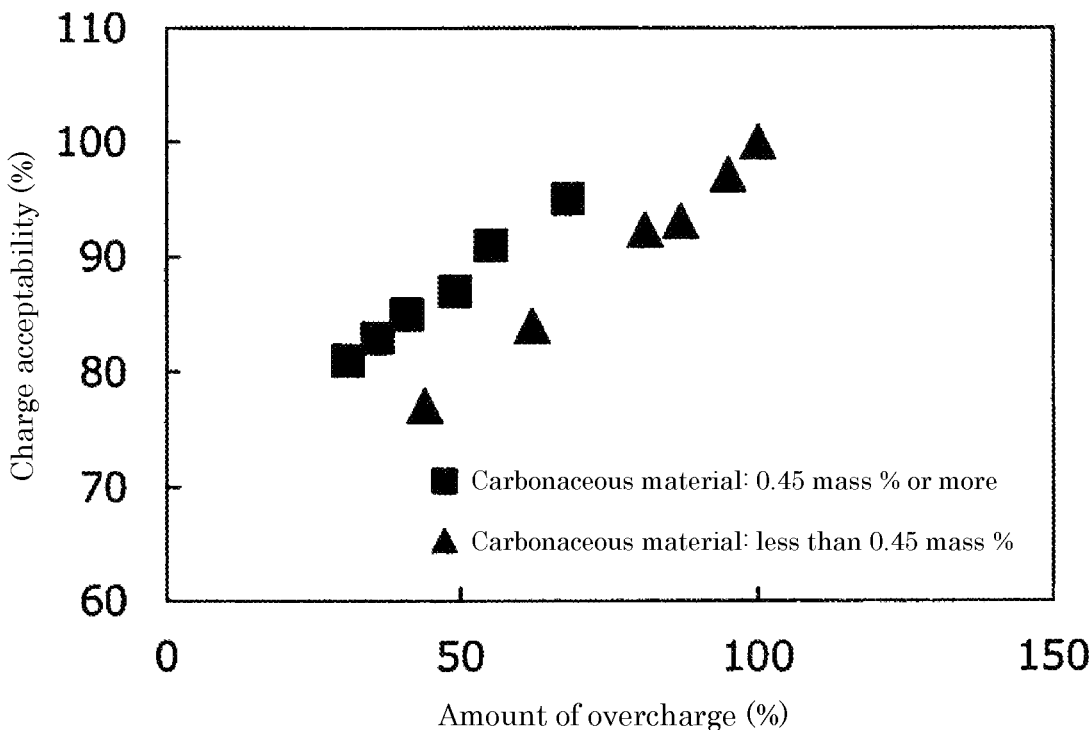
FIG. 4 is a graph showing a relationship between an amount of overcharge and the charge acceptability in Table 1.

A relationship between the ratio $C_n/S_n$ and the charge acceptability in Table 1 is shown in FIG. 3. A relationship between the amount of overcharge and the charge acceptability in Table 1 is shown in FIG. 4. In FIGS. 3 and 4, the case where the content $C_c$ of the carbonaceous material in

38

<<Lead-Acid Batteries E13-1 to E16-1, E13-2 to E16-2, and E15-3 to E15-5>>

A polymer compound (polypropylene glycol) having Mn shown in Table 2 is used. The constituent components of the negative electrode paste are mixed so that the content $C_n$ of the polymer compound in the negative electrode material determined by the procedure described above is the value shown in Table 2. Except for these, a test battery is prepared and evaluated similarly to the lead-acid battery E1. The polymer compounds used in E13-2 to E16-2 are the same as the polymer compounds used in E13-1 to E16-1, respectively. The polymer compounds used in E15-3 to E15-5 are the same as the polymer compounds used in E15-1 and E15-2.

For the polymer compound, in the $^1$H-NMR spectrum, the ratio of the integrated value of the peak of 3.2 ppm to 3.8 ppm to the sum of the integrated value of this peak, the integrated value of the peak of hydrogen atoms of the —CH$_2$— group bonded to the oxygen atom, and the integrated value of the peak of the hydrogen atom of the —CH< group bonded to the oxygen atom is 90.8% to 98.7%.

The results of the lead-acid batteries E13-1 to E16-1, E13-2 to E16-2, and E15-3 to E15-5 are shown in Table 2. The results of the lead-acid battery R1 are also shown in Table 2.

TABLE 2

| | R1 | E13-1 | E14-1 | E15-1 | E16-1 | E13-2 | E14-2 |
|---|---|---|---|---|---|---|---|
| Content $C_n$ of polymer compound in negative electrode material (mass ppm) | — | | | 82 | | | 350 |
| Ratio $C_n/S_n$ (mass ppm · m$^{-2}$ · g) | | | | 117 | | | 493 |
| Mn of polymer compound | — | 400 | 1000 | 2000 | 3000 | 400 | 1000 |
| Amount of overcharge (%) | 100 | 95 | 81 | 76 | 74 | 57 | 51 |
| Charge acceptability (%) | 100 | 96 | 94 | 92 | 91 | 58 | 57 |
| Low temperature HR discharge performance (%) after light load test | 100 | 101 | 123 | 131 | 134 | 82 | 90 |

| | E15-2 | E16-2 | E15-3 | E15-4 | E15-5 |
|---|---|---|---|---|---|
| Content $C_n$ of polymer compound in negative electrode material (mass ppm) | | 350 | | 800 | |
| Ratio $C_n/S_n$ (mass ppm · m$^{-2}$ · g) | | 493 | 1127 | 327 | 114 |
| Mn of polymer compound | 2000 | 3000 | | 2000 | |
| Amount of overcharge (%) | 48 | 45 | 25 | 58 | 80 |
| Charge acceptability (%) | 55 | 54 | 30 | 77 | 105 |
| Low temperature HR discharge performance (%) after light load test | 94 | 96 | 8 | 113 | 128 | the negative electrode material is 0.45% by mass or more and the case where the content $C_c$ is less than 0.45% by mass are separately shown. As shown in FIG. 3, when the content of the carbonaceous material is 0.45% by mass or more, the effect of suppressing the deterioration of the charge acceptability is remarkably enhanced as compared with the case where the content is less than 0.45% by mass. In FIG. 4, it can be seen that when the content of the carbonaceous material is 0.45% by mass or more, higher charge acceptability is obtained while maintaining a small amount of overcharge as compared with the case where the content of the carbonaceous material is less than 0.45% by mass. Such an effect is considered to be due to the fact that the polymer compound that easily covers the lead surface thinly is contained in the negative electrode material and the ratio $C_n/S_n$ is controlled so that it is easy to balance both characteristics.

As shown in Table 2, when the Mn of the polymer compound is 1,000 or more, the effect of reducing the amount of overcharge is enhanced. This is considered to be because the polymer compound tends to remain in the negative electrode material. In addition, when the Mn is 1,000 or more, excellent low temperature HR discharge performance after the high temperature light load test can be secured. This is considered to be because by reducing the amount of overcharge, the structural change of the negative active material due to the collision of the hydrogen gas with the negative active material is suppressed.

<<Lead-Acid Batteries E17-1 to E20-1 and E17-2 to E20-2>>

A polymer compound (polypropylene glycol) having Mn shown in Table 3 is added to the negative electrode material and the electrolyte solution. The composition of the negative electrode paste is adjusted so that the content $C_n$ of the polymer compound in the negative electrode material determined by the procedure described above is the value shown in Table 3. The polymer compound is added to the electrolyte solution so that the concentration of the polymer compound in the electrolyte solution determined by the procedure described above is the value shown in Table 3. Except for these, a test battery is prepared in the same manner as in the lead-acid battery E1, and the amount of overcharge is evaluated. The polymer compounds used in E17-1 to E20-1 are the same as the polymer compounds used in E13-1 to E16-1, respectively. The polymer compounds used in E17-2 to E20-2 are the same as the polymer compounds used in E13-1 to E16-1, respectively.

The results of the lead-acid batteries E17-1 to E20-1 and E17-2 to E20-2 are shown in Table 3. The results of the lead-acid battery R1 are also shown in Table 3.

(e3): Condensate of bisphenol compound having sulfonic acid group introduced and formaldehyde (sulfur element content: 3,000 μmol/g, Mw=9,000)

(e4): Condensate of bisphenol compound having sulfonic acid group introduced and formaldehyde (sulfur element content: 7,000 μmol/g, Mw=9,000)

As for the sulfur element content (μmol/g) in the organic expander, there is substantially no difference between a value before preparation of the negative electrode material and a value measured by disassembling the lead-acid battery and extracting each organic expander.

(d) Initial Low Temperature HR Discharge Performance

The test battery after full charge is discharged at a discharge current of 150 A at −15° C.±1° C. until the terminal voltage reaches 1.0 V/cell, and the discharge time (initial low temperature HR discharge duration time) (s) at

TABLE 3

| | R1 | E17-1 | E18-1 | E19-1 | E20-1 | E17-2 | E18-2 | E19-2 | E20-2 |
|---|---|---|---|---|---|---|---|---|---|
| Content $C_n$ of polymer compound in negative electrode material (mass ppm) | — | | 31 | | | | 62 | | |
| Ratio $C_n/S_n$ (mass ppm · m$^{-2}$ · g) | — | | 44 | | | | 44 | | |
| Concentration of polymer compound in electrolyte solution (mass ppm) | — | | 1200 | | | | 2400 | | |
| Mn of polymer compound in negative electrode material and in electrolyte solution | — | 400 | 1000 | 2000 | 3000 | 400 | 1000 | 2000 | 3000 |
| Amount of overcharge (%) | 100 | 96 | 77 | 85 | 83 | 83 | 77 | 79 | 51 |

As shown in Table 3, when the Mn of the polymer compound is 1,000 or more, the effect of reducing the amount of overcharge is remarkably enhanced. This is considered to be because the adsorptivity to lead is enhanced. In addition, it is considered that when the polymer compound is contained in the electrolyte solution at a certain concentration, elution of the polymer compound from the negative electrode plate is also suppressed.

<<Lead-Acid Batteries E21 to E23 and R2 to R4>>

An organic expander having a sulfur (S) element content shown in Table 4 is used. The constituent components of the negative electrode paste are mixed so that the content $C_n$ of the polymer compound in the negative electrode material determined by the procedure described above is the value shown in Table 4. Except for these, a test battery is prepared in the same manner as in the lead-acid battery E1, and the amount of overcharge and the charge acceptability are evaluated. The initial low temperature HR discharge performance is evaluated by the following procedure (d) using the lead-acid battery.

this time is obtained. The longer the discharge duration time, the better the low temperature HR discharge performance.

The initial low temperature HR discharge performance and the charge acceptability of the lead-acid batteries R1 and E15-1 are also evaluated in accordance with the above.

The amount of overcharge and the initial low temperature HR discharge performance of each of the lead-acid batteries E21, E22, E15-1, and E23 are evaluated by a ratio (%) when data of each of the lead-acid batteries R2, R3, R1, and R4 using the organic expander having the same sulfur element content is 100.

The charge acceptability of each of the lead-acid batteries E21, E22, E15-1, and E23 is evaluated by a ratio (%) when the 10 second electric quantity of each of the lead-acid batteries R2, R3, R1, and R4 using the organic expander having the same sulfur element content is 100.

The results of the lead-acid batteries E21 to E23 and R2 to R4 are shown in Table 4. The results of the lead-acid batteries R1 and E15-1 are also shown in Table 4.

TABLE 4

| | R2 | E21 | R3 | E22 | R1 | E15-1 | R4 | E23 |
|---|---|---|---|---|---|---|---|---|
| Content $C_n$ of polymer compound in negative electrode material (mass ppm) | 0 | 82 | 0 | 82 | 0 | 82 | 0 | 82 |
| Ratio $C_n/S_n$ (mass ppm · m$^{-2}$ · g) | 0 | 117 | 0 | 117 | 0 | 117 | 0 | 117 |
| Organic expander | e2 | | e3 | | e1 | | e4 | |
| S element content of organic expander (μmol/g) | 600 | | 3000 | | 5000 | | 7000 | |
| Amount of overcharge (%) | 100 | 75 | 100 | 75 | 100 | 76 | 100 | 75 |
| Charge acceptability (%) | 100 | 85 | 100 | 92 | 100 | 92 | 100 | 95 |
| Initial low temperature HR discharge performance (%) | 100 | 113 | 100 | 107 | 100 | 105 | 100 | 104 |

As the organic expander, the following expanders are used.

(e2): Lignin Sulfonate (Sulfur Element Content: 600 μMol/g, Mw=5,500)

As shown in Table 4, when the polymer compound and the first organic expander (preferably, an organic expander having a sulfur element content of 3,000 μmol/g or more) are used in combination, the deterioration of the charge acceptability is further suppressed. When the first organic expander is used, the particle size of lead sulfate generated during discharge is small and the specific surface area is large as compared with the case of using an organic expander having a small sulfur element content, so that lead sulfate is less likely to be coated with the polymer compound. As a result, it is considered that in the case of using the first organic expander, the deterioration of the charge acceptability is suppressed as compared with the case of using an organic expander having a small sulfur element content.

When the second organic expander having a small sulfur element content such as lignin sulfonate is used in combination with the polymer compound, the initial low temperature HR discharge performance is greatly improved. This is considered to be because the particle size of the colloid formed in sulfuric acid by the second organic expander is reduced by the surfactant action of the polymer compound as compared with a case where the polymer compound is not used, so that the discharge reaction easily proceeds. On the other hand, in the first organic expander having a high sulfur element content, even when the polymer compound is not used, the particle size of the colloid to be produced is small, and therefore, a change in particle size due to addition of the polymer compound is small. Thus, it is considered that an effect of improving the low temperature HR discharge performance is reduced.

<<Lead-Acid Batteries E24 to E28>>

The first organic expander and/or the second organic expander having a sulfur (S) element content shown in Table 5 are mixed so that the content of each organic expander determined by the procedure described above is the value shown in Table 5. Except for these, a test battery is prepared similarly to the lead-acid battery E1, and the charge acceptability is evaluated. As the first organic expander, the same (e1) as in the lead-acid battery E1 is used, and as the second organic expander, the same lignin sulfonate (e2) as in the lead-acid battery E20 is used. As for the sulfur element content (µmol/g) in the organic expander, there is substantially no difference between a value before preparation of the negative electrode material and a value measured by disassembling the lead-acid battery and extracting each organic expander.

The charge acceptability of the lead-acid batteries E24 to E28 is evaluated by a ratio (%) when the 10 second electric quantity of the lead-acid battery E24 is 100.

The results of the lead-acid batteries E24 to E28 are shown in Table 5.

TABLE 5

|  | E24 | E25 | E26 | E27 | E28 |
|---|---|---|---|---|---|
| Content $C_n$ of polymer compound in negative electrode material (mass ppm) |  |  | 82 |  |  |
| Ratio $C_n/S_n$ (mass ppm · m$^{-2}$ · g) |  |  | 117 |  |  |
| First organic expander (S element content: 5,000 µmol g$^{-1}$) (mass %) | 0 | 0.05 | 0.1 | 0.15 | 0.2 |
| Second organic expander (S element content: 600 µmol g$^{-1}$) (mass %) | 0.2 | 0.15 | 0.1 | 0.05 | 0 |
| Charge acceptability (%) | 100 | 105 | 111 | 108 | 103 |

As shown in Table 5, when the polymer compound is used, high charge acceptability is obtained by using both organic expanders in combination. The result when the first organic expander and the second organic expander are used in combination is superior to the value of the charge acceptability assumed when each organic expander is used alone. From this, it can be said that when the polymer compound is used, a synergistic effect is obtained by using the first organic expander and the second organic expander.

<<Lead-Acid Battery E29>>

An organic expander e5 (condensate of bisphenol S compound having sulfonic acid group introduced and phenol sulfonic acid with formaldehyde (sulfur element content: 4,000 µmol/g, Mw=8,000)) is used. Except for this, a test battery is prepared and evaluated similarly to the lead-acid battery E15-1.

<<Lead-Acid Batteries R5-1, R5-2, R6-1 and R6-2>>

When the constituent components of the negative electrode paste are mixed, lignin sulfonate (sulfur element content is 600 µmol/g, Mw=5,500) or oil is added in place of the polymer compound so that the content in the negative electrode material is the value shown in Table 6. Except for this, a test battery is prepared and evaluated similarly to the lead-acid battery E15-1. As the oil, a paraffin-based oil is used. Neither the paraffin-based oil nor the lignin sulfonate has a peak in a range of 3.2 ppm or more and 3.8 ppm or less in a chemical shift of a $^1$H-NMR spectrum measured using deuterated chloroform as a solvent.

The results of the lead-acid batteries E29, R5-1, R5-2, R6-1, and R6-2 are shown in Table 6. The results of the lead-acid batteries R1 and E15-1 are also shown in Table 6.

TABLE 6

|  | R1 | E15-1 | E29 | R5-1 | R5-2 | R6-1 | R6-2 |
|---|---|---|---|---|---|---|---|
| Content $C_n$ of polymer compound in negative electrode material (mass ppm) | 0 | 82 | 82 | 0 |  | 0 |  |
| Ratio $C_n/S_n$ (mass ppm · m$^{-2}$ · g) | 0 | 117 | 117 | 0 |  | 0 |  |
| Organic expander (content in negative electrode material (mass %)) | e1 (0.1) | e1 (0.1) | e5 (0.1) | e1 (0.1) |  | e1 (0.1) |  |
| Additive (content in negative electrode material) | — | — | — | Lignin sulfonate |  | Oil |  |
|  |  |  |  | 82 mass ppm | 0.1 mass % | 82 mass ppm | 0.1 mass % |
| Amount of overcharge (%) | 100 | 76 | 74 | 100 | 86 | 101 | 82 |
| Charge acceptability (%) | 100 | 92 | 93 | 100 | 87 | 99 | 90 |
| Low temperature HR discharge performance (%) after light load test | 100 | 131 | 128 | — | 136 | — | 109 |

As shown in Table 6, in the lead-acid batteries E15-1 and E29, the amount of overcharge can be effectively reduced even when the content of the polymer compound in the negative electrode material is as very small as 82 ppm. On the other hand, in the lead-acid battery R5-1 or R6-1 using lignin sulfonate or oil, unlike the lead-acid batteries E15-1 and E29 using the polymer compound, the effect of reducing the amount of overcharge is not observed at all. From this, it is considered that the polymer compound is in a state in which an interaction such as an adsorption action on lead or lead sulfate is different from that of lignin sulfonate or oil in the negative electrode material. As described above, even when a conventional organic additive (specifically, an organic additive having no peak in the range of 3.2 ppm or more and 3.8 ppm or less in the chemical shift of the $^1$H-NMR spectrum) is used instead of the polymer compound, the effect of reducing the amount of overcharge cannot be obtained. Thus, in the lead-acid batteries R5-1 and R6-1, the effect of suppressing the hydrogen generation during overcharge is small, and the liquid decrease suppressing effect is small.

As indicated by R5-2 and R6-2, even in the case of using lignin sulfonate or oil, when the content in the negative electrode material is large, the effect of reducing the amount of overcharge can be obtained to some extent. However, when lignin sulfonate or oil is added to such an extent that the effect of reducing the amount of overcharge is obtained, the charge acceptability is also deteriorated. That is, with the conventional organic additive, it is difficult to suppress the deterioration of the charge acceptability while reducing the amount of overcharge. On the other hand, in the lead-acid batteries E15-1 and E29, although a high effect of reducing the amount of overcharge is obtained, the deterioration of and the effect of suppressing the deterioration of the charge acceptability is enhanced in the case of using the polymer compound.

In the lead-acid batteries E15-1 and E29, as compared with the lead-acid battery R1, high low temperature HR discharge performance can be secured even after the high temperature light load test. This is considered to be because the uneven distribution of the polymer compound in the lead pores is suppressed, so that ions easily move, the generation of hydrogen gas during overcharge is suppressed, and the structural change of the negative active material due to the collision of hydrogen gas is reduced.

From the results of Table 4, it can be seen that an effect similar to that of the lead-acid batteries E15-1 and E29 can be obtained also in the case of using the organic expanders e2 to e4.

<<Lead-Acid Batteries E30 to E36>>

As the polymer compound, the polymer compound shown in Table 7 is used. The constituent components of the negative electrode paste are mixed so that the content $C_n$ of the polymer compound in the negative electrode material determined by the procedure described above is the value shown in Table 7. Except for these, a test battery is prepared and evaluated similarly to the lead-acid battery E1. For the polymer compound, in the $^1$H-NMR spectrum, the ratio of the integrated value of the peak of 3.2 ppm to 3.8 ppm to the sum of the integrated value of this peak, the integrated value of the peak of hydrogen atoms of the —CH$_2$— group bonded to the oxygen atom, and the integrated value of the peak of the hydrogen atom of the —CH< group bonded to the oxygen atom is 97.6% to 99.7%.

The results of the lead-acid batteries E30 to E36 are shown in Table 7. The results of the lead-acid battery R1 are also shown in Table 7.

TABLE 7

| | Content $C_n$ of polymer compound in negative electrode material | Ratio $C_n/S_n$ | Polymer compound | | Amount of overcharge | Charge acceptability |
| | (mass ppm) | (mass ppm · m$^{-2}$ · g) | Type | Mn | (%) | (%) |
|---|---|---|---|---|---|---|
| R1 | 0 | 282 | — | — | 100 | 100 |
| E30 | 300 | | Polypropylene glycol | 2000 | 44 | 58 |
| E31 | 300 | | Polyoxyethylene polyoxypropylene butyl ether (oxypropylene unit 43 mol %) | 1800 | 44 | 81 |
| E32 | 300 | | Polyoxypropylene butyl ether | 2390 | 55 | 85 |
| E33 | 300 | | Polyoxyethylene polyoxypropylene hexylene glycol ether (oxypropylene unit 20 mol %) | 14000 | 37 | 54 |
| E34 | 300 | | Polyoxypropylene methyl ether | 1800 | 45 | 78 |
| E35 | 300 | | Polyoxypropylene ethyl ether | 2200 | 45 | 77 |
| E36 | 300 | | Polyoxypropylene acetate | 1900 | 45 | 76 | the charge acceptability is suppressed, and high charge acceptability can be secured. From this, it is considered that in the negative electrode material, most of the surface of lead or lead sulfate is thinly covered with the polymer compound, and the hydrogen overvoltage in the negative electrode plate increases. It is considered that since the lead surface is thinly covered with the polymer compound, elution of lead sulfate is less likely to be inhibited, and therefore, the deterioration of the charge acceptability is suppressed in the lead-acid batteries E15-1 and E29. Therefore, as compared with the case of using other organic additives such as lignin sulfonate and oil, it can be said that the effect of simultaneously achieving the effect of reducing the amount of overcharge As shown in Table 7, even when an etherified product or an esterified product of a hydroxy compound having the repeating structure of the oxy $C_{2-4}$ alkylene units is used, the deterioration of the charge acceptability is suppressed while reducing the amount of overcharge.

INDUSTRIAL APPLICABILITY

The lead-acid battery according to one aspect of the present invention can be suitably used as, for example, a power source for starting a vehicle (automobiles, motorcycles, etc.) and a power source for an industrial energy storage apparatus or the like such as an electric vehicle (forklift, etc.). Note that these applications are merely illustrative and not limited to these applications.

DESCRIPTION OF REFERENCE SIGNS

1: lead-acid battery
2: negative electrode plate
3: positive electrode plate
4: separator
5: positive electrode shelf portion
6: negative electrode shelf portion
7: positive pole
8: penetrating connection body
9: negative pole
11: element
12: container
13: partition
14: cell chamber
15: lid
16: negative electrode terminal
17: positive electrode terminal
18: vent plug

The invention claimed is:

1. A lead-acid battery comprising a positive electrode plate, a negative electrode plate, and an electrolyte solution,
wherein the negative electrode plate includes a negative electrode material,
the negative electrode material contains a polymer compound having a repeating structure of oxy $C_{2\text{-}4}$ alkylene units, and
a ratio: $C_n/S_n$ of a content $C_n$ of the polymer compound in the negative electrode material to a specific surface area $S_n$ of the negative electrode material is 25 ppm·m$^{-2}$·g or more, the specific surface area $S_n$ of the negative electrode material being a BET specific surface area determined by a gas adsorption method using nitrogen gas.

2. The lead-acid battery according to claim 1, wherein the ratio $C_n/S_n$ is 800 ppm·m$^{-2}$·g or less.

3. The lead-acid battery according to claim 1, wherein the ratio $C_n/S_n$ is 450 ppm·m$^{-2}$·g or less.

4. The lead-acid battery according to claim 1, wherein the ratio $C_n/S_n$ is 90 ppm·m$^{-2}$·g or more and 410 ppm·m$^{-2}$·g or less.

5. The lead-acid battery according to claim 1, wherein the specific surface area $S_n$ is 0.5 m$^2$·g$^{-1}$ or more.

6. The lead-acid battery according to claim 1, wherein the negative electrode material contains a carbonaceous material, and
a content $C_c$ of the carbonaceous material in the negative electrode material is 0.45% by mass or more.

7. The lead-acid battery according to claim 1, wherein the polymer compound contains at least one selected from the group consisting of an etherified product of a hydroxy compound having a repeating structure of the oxy $C_{2\text{-}4}$ alkylene units and an esterified product of a hydroxy compound having the repeating structure of the oxy $C_{2\text{-}4}$ alkylene units, and
the hydroxy compound is at least one selected from the group consisting of a poly $C_{2\text{-}4}$ alkylene glycol, a copolymer having a repeating structure of oxy $C_{2\text{-}4}$ alkylene, and a $C_{2\text{-}4}$ alkylene oxide adduct of a polyol.

8. The lead-acid battery according to claim 1, wherein the repeating structure of the oxy $C_{2\text{-}4}$ alkylene units contains at least a repeating structure of oxypropylene units.

9. The lead-acid battery according to claim 1, wherein the polymer compound contains at least a compound having a number average molecular weight of 1,000 or more.

10. The lead-acid battery according to claim 1, wherein the negative electrode material further contains a first organic expander having a sulfur element content of 2,000 µmol/g or more.

11. The lead-acid battery according to claim 10, wherein the first organic expander contains a condensate containing a unit of an aromatic compound having a sulfur-containing group, and
the condensate contains, as the unit of the aromatic compound, at least one selected from the group consisting of a unit of a bisarene compound and a unit of a monocyclic aromatic compound.

12. The lead-acid battery according to claim 11, wherein the condensate contains the unit of the bisarene compound and the unit of the monocyclic aromatic compound.

13. The lead-acid battery according to claim 11, wherein the unit of the monocyclic aromatic compound includes a unit of a hydroxyarene compound.

14. The lead-acid battery according to claim 1, wherein the negative electrode material further contains a second organic expander having a sulfur element content of less than 2,000 µmol/g.

* * * * *